United States Patent
Duggal et al.

(10) Patent No.: US 12,001,891 B1
(45) Date of Patent: Jun. 4, 2024

(54) SYSTEMS AND METHODS FOR ANALYZING RISKS ASSOCIATED WITH ONE OR MORE DEVELOPERS IN MULTI-CLOUD PLATFORMS

(71) Applicant: Engineer.ai Corp., Salt Lake City, UT (US)

(72) Inventors: Sachin Dev Duggal, Salt Lake City, UT (US); Rohan Patel, London (GB)

(73) Assignee: Engineer.ai Corp., Salt Lake City, UT (US)

( * ) Notice: Subject to any disclaimer, the term of this patent is extended or adjusted under 35 U.S.C. 154(b) by 0 days.

(21) Appl. No.: 18/320,195

(22) Filed: May 18, 2023

(51) Int. Cl.
*G06F 9/50* (2006.01)

(52) U.S. Cl.
CPC .................................. *G06F 9/5072* (2013.01)

(58) Field of Classification Search
None
See application file for complete search history.

(56) References Cited

U.S. PATENT DOCUMENTS

| | | | |
|---|---|---|---|
| 10,826,799 B2 | 11/2020 | Son et al. | |
| 11,204,983 B2 * | 12/2021 | Kannan | G06F 8/73 |
| 2012/0124211 A1 * | 5/2012 | Kampas | H04L 47/80 |
| | | | 709/226 |
| 2012/0290712 A1 * | 11/2012 | Walter | H04L 63/1416 |
| | | | 709/224 |
| 2014/0188719 A1 * | 7/2014 | Poornachandran | G06Q 20/36 |
| | | | 705/41 |
| 2014/0278807 A1 | 9/2014 | Bohacek | |
| 2014/0351421 A1 | 11/2014 | Madani et al. | |
| 2018/0287898 A1 | 10/2018 | Bellini, III et al. | |
| 2020/0218634 A1 | 7/2020 | Jones et al. | |
| 2021/0182946 A1 * | 6/2021 | Tapia | G06F 9/451 |
| 2023/0004440 A1 * | 1/2023 | Hanel | G06F 9/5055 |
| 2023/0122947 A1 * | 4/2023 | DeAvila | G06Q 10/06313 |
| | | | 705/301 |
| 2023/0148374 A1 * | 5/2023 | Challagolla | G06F 8/77 |
| | | | 717/102 |

FOREIGN PATENT DOCUMENTS

WO 2023014384 A1 2/2023

OTHER PUBLICATIONS

Office Action dated Feb. 26, 2024 in U.S. Appl. No. 18/320,189.
Office Action dated Mar. 14, 2024 in U.S. Appl. No. 18/320,191.

* cited by examiner

*Primary Examiner* — Joshua Joo
(74) *Attorney, Agent, or Firm* — Mahesh Law Group PC; Kumar Maheshwari

(57) ABSTRACT

Systems and methods for analyzing risks associated with one or more developers in multi-cloud platforms is disclosed. The system includes a processor coupled to a memory. The processor is configured to recommend one or more cloud infrastructures for the one or more developers to host one or more projects assigned to them. The one or more cloud infrastructures are recommended based on one or more parameters. The processor is further configured to determine a risk pattern for each developer upon selection of at least one cloud infrastructure. The risk pattern is determined based on one or more factors. In addition, the processor is configured to generate a cloud wallet for each developer based on the risk pattern determined.

14 Claims, 13 Drawing Sheets

SYSTEMS AND METHODS FOR ANALYZING RISKS ASSOCIATED WITH ONE OR MORE DEVELOPERS IN MULTI-CLOUD PLATFORMS

FIELD

This disclosure relates to project management, and more particularly to systems and methods for optimizing and managing costs while using one or more cloud platforms.

BACKGROUND

Cloud computing or cloud refers to one or more servers that customers/people may access over the internet. Cloud computing enables people/companies to accelerate businesses and streamline innovations with speed and scale. With the rise of cloud computing over the last decade, many people/businesses rely on cloud platforms for hosting/performing their work and business-related activities. The current cloud platforms have fixed costs/fees that their customers pay for a storage amount allocated to them. However, some people/companies may register themselves in one or more cloud platforms that they would require for small projects or a short-term duration. Even though their requirements are less, they will pay a fixed cost for accessing the cloud platform and getting storage. Also, a lack of transparency into cloud usage/spending is another challenge many people/companies may face. Due to the lack of transparency, some people/companies may come across hidden costs and spend excessively even if they have unused services running. Thus, there is a need in the art for an improved cloud cost and usage management tool.

SUMMARY

The disclosed subject matter relates to a system for optimizing cloud management costs. The system includes a processor coupled to a memory. The processor is configured to receive a cloud account opening application from one or more users. The processor is further configured to recommend one or more cloud infrastructures for the one or more users once the cloud account opening application is received. The one or more cloud infrastructures are recommended based on one or more parameters. In addition, the processor is configured to generate a fixed cloud amount for the one or more users to pay upon selection of at least one cloud infrastructure.

The disclosed subject matter also relates to a method for capturing deployment details of an application. The method includes receiving a cloud account opening application from one or more users. The method further includes recommending one or more cloud infrastructures for the one or more users once the cloud account opening application is received. The one or more cloud infrastructures are recommended based on one or more parameters. In addition, the method includes generating a fixed cloud amount for the one or more users to pay upon selection of at least one cloud infrastructure.

The disclosed subject matter also relates to a computer readable storage medium having data stored therein representing software executable by a computer, the software comprising instructions that, when executed, cause the computer readable storage medium to perform receiving a cloud account opening application from one or more users. The instructions further cause the computer readable storage medium to perform recommending one or more cloud infrastructures for the one or more users once the cloud account opening application is received. The one or more cloud infrastructures are recommended based on one or more parameters. In addition, the instructions cause the computer readable storage medium to perform generating a fixed cloud amount for the one or more users to pay upon selection of at least one cloud infrastructure.

The disclosed subject matter further relates to a system for regulating multi-cloud expenses. The system includes a processor coupled to a memory. The processor is configured to receive a request for onboarding one or more developers to complete one or more projects. The request includes one or more features assigned for each project. The processor is further configured to group the one or more developers into one or more batches to complete each project. The one or more developers are grouped based on a grouping criteria. The processor is further configured to allocate one or more cloud infrastructures for the one or more developers in each batch for hosting each project. In addition, the processor is configured to generate a monthly cloud cost for each cloud infrastructure based on a usage pattern.

The disclosed subject matter also relates to a method for regulating multi-cloud expenses. The method includes receiving a request for onboarding one or more developers to complete one or more projects. The request includes one or more features assigned for each project. The method further includes grouping the one or more developers into one or more batches to complete each project. The one or more developers are grouped based on a grouping criteria. The method further includes allocating one or more cloud infrastructures for the one or more developers in each batch for hosting each project. In addition, the method includes generating a monthly cloud cost for each cloud infrastructure based on a usage pattern.

The disclosed subject matter also relates to a computer readable storage medium having data stored therein representing software executable by a computer, the software comprising instructions that, when executed, cause the computer readable storage medium to perform receiving a request for onboarding one or more developers to complete one or more projects. The request includes one or more features assigned for each project. The instructions further cause the computer readable storage medium to perform grouping the one or more developers into one or more batches to complete each project. The one or more developers are grouped based on a grouping criteria. The instructions further cause the computer readable storage medium to perform allocating one or more cloud infrastructures for the one or more developers in each batch for hosting each project. In addition, the instructions cause the computer readable storage medium to perform generating a monthly cloud cost for each cloud infrastructure based on a usage pattern.

In addition, the disclosed subject matter relates to a system for analyzing risks associated with one or more developers in multi-cloud platforms. The system includes a processor coupled to a memory. The processor is configured to recommend one or more cloud infrastructures for the one or more developers to host one or more projects assigned to them. The one or more cloud infrastructures are recommended based on one or more parameters. The processor is further configured to determine a risk pattern for each developer upon selection of at least one cloud infrastructure. The risk pattern is determined based on one or more factors. In addition, the processor is configured to generate a cloud wallet for each developer based on the risk pattern determined.

The disclosed subject matter also relates to a method for analyzing risks associated with one or more developers in multi-cloud platforms. The method includes recommending one or more cloud infrastructures for the one or more developers to host one or more projects assigned to them. The one or more cloud infrastructures are recommended based on one or more parameters. The method further includes determining a risk pattern for each developer upon selection of at least one cloud infrastructure. The risk pattern is determined based on one or more factors. In addition, the method includes generating a cloud wallet for each developer based on the risk pattern determined.

The disclosed subject matter also relates to a computer readable storage medium having data stored therein representing software executable by a computer, the software comprising instructions that, when executed, cause the computer readable storage medium to perform recommending one or more cloud infrastructures for the one or more developers to host one or more projects assigned to them. The one or more cloud infrastructures are recommended based on one or more parameters. The instructions further cause the computer readable storage medium to perform determining a risk pattern for each developer upon selection of at least one cloud infrastructure. The risk pattern is determined based on one or more factors. In addition, the instructions cause the computer readable storage medium to perform generating a cloud wallet for each developer based on the risk pattern determined.

DETAILED DESCRIPTION

Embodiments, of the present disclosure, will now be described with reference to the accompanying drawing.

Embodiments are provided so as to convey the scope of the present disclosure thoroughly and fully to the person skilled in the art. Numerous details, are set forth, relating to specific components, and methods, to provide a complete understanding of embodiments of the present disclosure. It will be apparent to the person skilled in the art that the details provided in the embodiments may not be construed to limit the scope of the present disclosure. In some embodiments, well-known processes, well-known apparatus structures, and well-known techniques are not described in detail.

The terminology used, in the present disclosure, is for the purpose of explaining a particular embodiment and such terminology may not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, elements, modules, units and/or components, but do not forbid the presence or addition of one or more other features, elements, components, and/or groups thereof. The particular order of steps disclosed in the method and process of the present disclosure is not to be construed as requiring their performance as described or illustrated. It is also to be understood that additional or alternative steps may be employed.

Figure 1:
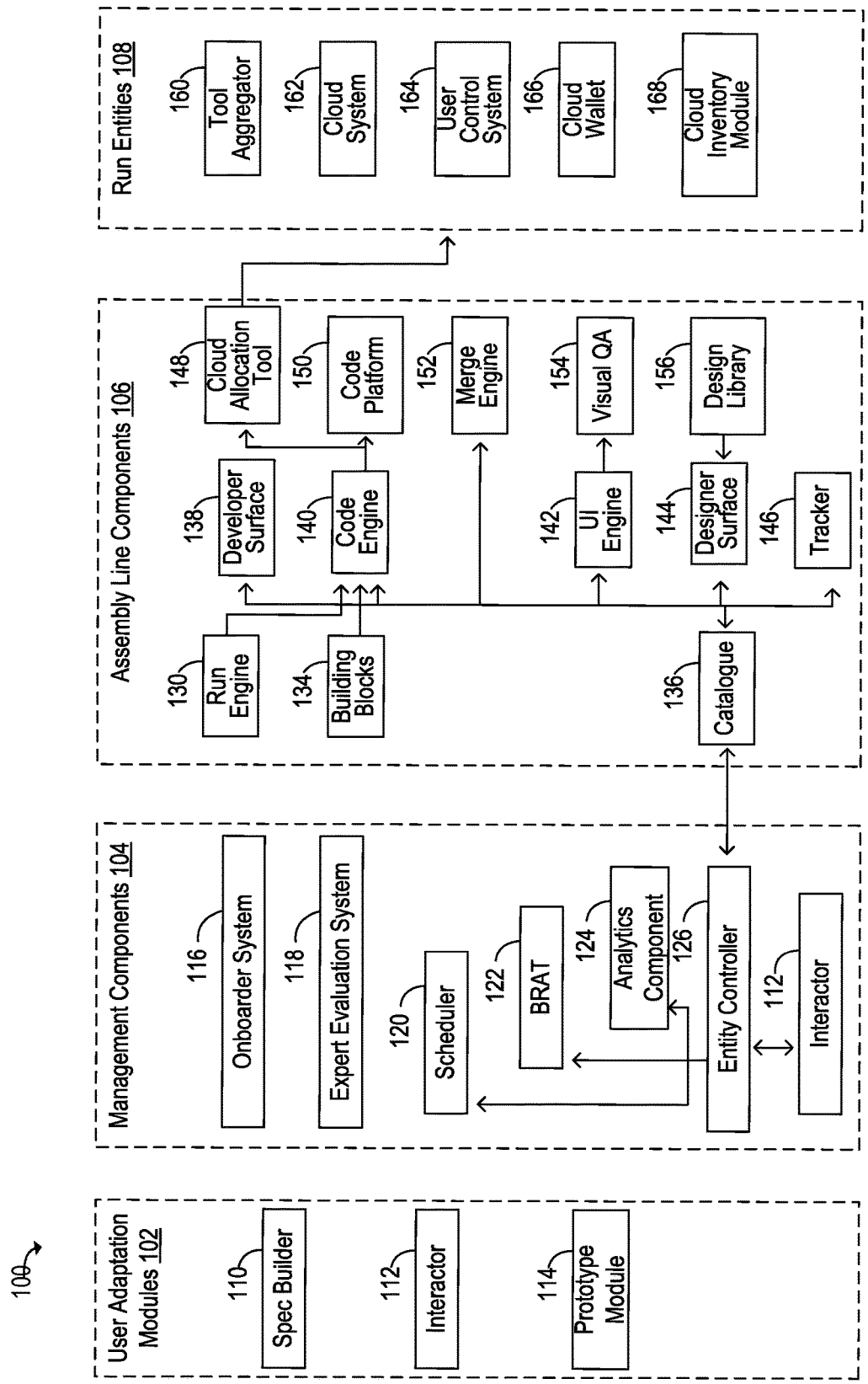
FIG. 1 is a software building system illustrating the components that may be used in an embodiment of the disclosed subject matter.

Referring to FIG. 1, FIG. 1 is a schematic of a software building system 100 illustrating the components that may be used in an embodiment of the disclosed subject matter. The software building system 100 is an AI-assisted platform that comprises entities, circuits, modules, and components that enable the use of state-of-the-art algorithms to support producing custom software.

A user may leverage the various components of the software building system 100 to quickly design and complete a software project. The features of the software building system 100 operate AI algorithms where applicable to streamline the process of building software. Designing, building and managing a software project may all be automated by the AI algorithms.

To begin a software project, an intelligent AI conversational assistant may guide users in conception and design of their idea. Components of the software building system 100 may accept plain language specifications from a user and convert them into a computer readable specification that can be implemented by other parts of the software building system 100. Various other entities of the software building system 100 may accept the computer readable specification or buildcard to automatically implement it and/or manage the implementation of the computer readable specification.

The embodiment of the software building system 100 shown in FIG. 1 includes user adaptation modules 102, management components 104, assembly line components 106, and run entities 108. The user adaptation modules 102 entities guide a user during all parts of a project from the idea conception to full implementation. user adaptation modules 102 may intelligently link a user to various entities of the software building system 100.

The user adaptation modules 102 may include a specification builder 110, an interactor 112 system, and the prototype module 114. They may be used to guide a user through a process of building software and managing a software project. The specification builder 110, the interactor 112 system, and the prototype module 114 may be used concurrently and/or link to one another. For instance, the specification builder 110 may accept user specifications that are generated in an interactor 112 system. The prototype module 114 may utilize computer generated specifications that are produced in specification builder 110 to create a prototype for various features. Further, the interactor 112 system may aid a user in implementing all features in specification builder 110 and the prototype module 114.

The specification builder 110 converts user supplied specifications into specifications that can be automatically read and implemented by various objects, instances, or entities of the software building system 100. The machine readable specifications may be referred to herein as a buildcard. In an example of use, specification builder 110 may accept a set of features, platforms, etc., as input and generate a machine readable specification for that project. Specification builder 110 may further use one or more machine learning algorithms to determine a cost and/or timeline for a given set of features. In an example of use, specification builder 110 may determine potential conflict points and factors that will significantly affect cost and timeliness of a project based on training data. For example, historical data may show that a combination of various building block components create a data transfer bottleneck. Specification builder 110 may be configured to flag such issues.

The interactor 112 system is an AI powered speech and conversational analysis system. It converses with a user with a goal of aiding the user. In one example, the interactor 112 system may ask the user a question to prompt the user to answer about a relevant topic. For instance, the relevant topic may relate to a structure and/or scale of a software project the user wishes to produce. The interactor 112 system makes use of natural language processing (NLP) to decipher various forms of speech including comprehending words, phrases, and clusters of phases In an exemplary embodiment, the NLP implemented by interactor 112 system is based on a deep learning algorithm. Deep learning is a form of a neural network where nodes are organized into layers. A neural network has a layer of input nodes that accept input data where each of the input nodes are linked to nodes in a next layer. The next layer of nodes after the input layer may be an output layer or a hidden layer. The neural network may have any number of hidden layers that are organized in between the input layer and output layers.

Data propagates through a neural network beginning at a node in the input layer and traversing through synapses to nodes in each of the hidden layers and finally to an output layer. Each synapse passes the data through an activation function such as, but not limited to, a Sigmoid function. Further, each synapse has a weight that is determined by training the neural network. A common method of training a neural network is backpropagation. Backpropagation is an algorithm used in neural networks to train models by adjusting the weights of the network to reduce the difference between predicted and actual outputs. During training, backpropagation works by propagating the error back through the network, layer by layer, and updating the weights in the opposite direction of the gradient of the loss function. By repeating this process over many iterations, the network gradually learns to produce more accurate outputs for a given input.

Various systems and entities of the software building system 100 may be based on a variation of a neural network or similar machine learning algorithm. For instance, input for NLP systems may be the words that are spoken in a sentence. In one example, each word may be assigned to separate input node where the node is selected based on the word order of the sentence. The words may be assigned various numerical values to represent word meaning whereby the numerical values propagate through the layers of the neural network.

The NLP employed by the interactor 112 system may output the meaning of words and phrases that are communicated by the user. The interactor 112 system may then use the NLP output to comprehend conversational phrases and sentences to determine the relevant information related to the user's goals of a software project. Further machine learning algorithms may be employed to determine what kind of project the user wants to build including the goals of the user as well as providing relevant options for the user.

The prototype module 114 can automatically create an interactive prototype for features selected by a user. For instance, a user may select one or more features and view a prototype of the one or more features before developing them. The prototype module 114 may determine feature links to which the user's selection of one or more features would be connected. In various embodiments, a machine learning algorithm may be employed to determine the feature links. The machine learning algorithm may further predict embeddings that may be placed in the user selected features.

An example of the machine learning algorithm may be a gradient boosting model. A gradient boosting model may use successive decision trees to determine feature links. Each decision tree is a machine learning algorithm in itself and includes nodes that are connected via branches that branch based on a condition into two nodes. Input begins at one of the nodes whereby the decision tree propagates the input down a multitude of branches until it reaches an output node. The gradient boosted tree uses multiple decision trees in a series. Each successive tree is trained based on errors of the previous tree and the decision trees are weighted to return results.

The prototype module 114 may use a secondary machine learning algorithm to select a likely starting screen for each prototype. Thus, a user may select one or more features and the prototype module 114 may automatically display a prototype of the selected features.

The software building system 100 includes management components 104 that aid the user in managing a complex software building project. The management components 104 allow a user that does not have experience in managing software projects to effectively manage multiple experts in various fields. An embodiment of the management components 104 include the onboarding system 116, an expert evaluation system 118, scheduler 120, BRAT 122, analytics component 124, entity controller 126, and the interactor 112 system.

The onboarding system 116 aggregates experts so they can be utilized to execute specifications that are set up in the software building system 100. In an exemplary embodiment, software development experts may register into the onboarding system 116 which will organize experts according to their skills, experience, and past performance. In one example, the onboarding system 116 provides the following features: partner onboarding, expert onboarding, reviewer assessments, expert availability management, and expert task allocation.

An example of partner onboarding may be pairing a user with one or more partners in a project. The onboarding system 116 may prompt potential partners to complete a profile and may set up contracts between the prospective partners. An example of expert onboarding may be a systematic assessment of prospective experts including receiving a profile from the prospective expert, quizzing the prospective expert on their skill and experience, and facilitating courses for the expert to enroll and complete. An example of reviewer assessments may be for the onboarding system 116 to automatically review completed portions of a project. For instance, the onboarding system 116 may analyze submitted code, validate functionality of submitted code, and assess a status of the code repository. An example of expert availability management in the onboarding system 116 is to manage schedules for expert assignments and oversee expert compensation. An example of expert task allocation is to automatically assign jobs to experts that are onboarded in the onboarding system 116. For instance, the onboarding system 116 may determine a good fit to match onboarded experts with project goals and assign appropriate tasks to the determined experts.

The expert evaluation system 118 continuously evaluates developer experts. In an exemplary embodiment, the expert evaluation system 118 rates experts based on completed tasks and assigns scores to the experts. The scores may provide the experts with critique and provide the onboarding system 116 with metrics with it can use to allocate the experts on future tasks.

Scheduler 120 keeps track of overall progress of a project and provides experts with job start and job completion estimates. In a complex project, some expert developers may be expected to wait until parts of a project are completed before their tasks can begin. Thus, effective time allocation can improve expert developer management. Scheduler 120 provides up to date estimates to expert developers for job start and completion windows so they can better manage their own time and position them to complete their job on time with high quality.

The big resource allocation tool (BRAT 122) is capable of generating developer assignments for all available parallel workstream across multiple projects. BRAT 122 system allows expert developers to be efficiently managed to reduce cost and time. In an exemplary embodiment, the BRAT 122 system considers a plethora of information including feature complexity, developer expertise, past developer experience, time zone, and project affinity to make assignments to expert developers. The BRAT 122 system may make use of the expert evaluation system 118 to determine the top experts for various assignments. Further, the expert evaluation system 118 may be leveraged to provide live grading to experts and employ qualitative and quantitative feedback. For instance, experts may be assigned a live score based on the number of jobs completed and the quality of jobs completed.

The analytics component 124 is a dashboard that provides a view of progress in a project. One of many purposes of the analytics component 124 dashboard is to provide a primary form of communication between a user and the project developers. Thus, offline communication, which can be time consuming and stressful, may be reduced. In an exemplary embodiment, the analytics component 124 dashboard may show live progress as a percentage feature along with releases, meetings, account settings, and ticket sections. Through the analytics component 124 dashboard, dependencies may be viewed and resolved by users or developer experts.

The entity controller 126 is a primary hub for entities of the software building system 100. It connects to scheduler 120, the BRAT 122 system, and the analytics component 124 to provide for continuous management of expert developer schedules, expert developer scoring for completed projects, and communication between expert developers and users. Through the entity controller 126, both expert developers and users may assess a project, make adjustments, and immediately communicate any changes to the rest of the development team.

The entity controller 126 may be linked to the interactor 112 system, allowing users to interact with a live project via an intelligent AI conversational system. Further, the Interactor 112 system may provide expert developers with up-to-date management communication such as text, email, ticketing, and even voice communications to inform developers of expected progress and/or review of completed assignments.

The assembly line components 106 comprise underlying components that provide the functionality to the software building system 100. The embodiment of the assembly line components 106 shown in FIG. 1 includes a run engine 130, building block components 134, catalogue 136, developer surface 138, a code engine 140, a UI engine 142, a designer surface 144, tracker 146, a cloud allocation tool 148, a code platform 150, a merge engine 152, visual QA 154, and a design library 156.

The run engine 130 may maintain communication between various building block components within a project as well as outside of the project. In an exemplary embodiment, the run engine 130 may send HTTP/S GET or POST requests from one page to another.

The building block components 134 are reusable code that are used across multiple computer readable specifications. The term buildcards, as used herein, refer to machine readable specifications that are generated by specification builder 110, which may convert user specifications into a computer readable specification that contains the user specifications and a format that can be implemented by an automated process with minimal intervention by expert developers.

The computer readable specifications are constructed with building block components 134, which are reusable code components. The building block components 134 may be pretested code components that are modular and safe to use. In an exemplary embodiment, the building block components 134 consists of two sections—core and custom. Core sections comprise the lines of code which represent the main functionality and reusable components across computer readable specifications. The custom sections comprise the snippets of code that define customizations specific to the computer readable specification. This could include placeholder texts, theme, color, font, error messages, branding information, etc.

Catalogue 136 is a management tool that may be used as a backbone for applications of the software building system 100. In an exemplary embodiment, the catalogue 136 may be linked to the entity controller 126 and provide it with centralized, uniform communication between different services.

Developer surface 138 is a virtual desktop with preinstalled tools for development. Expert developers may connect to developer surface 138 to complete assigned tasks. In an exemplary embodiment, expert developers may connect to developer surface from any device connected to a network that can access the software project. For instance, developer experts may access developer surface 138 from a web browser on any device. Thus, the developer experts may work from anywhere across geographic constraints. In various embodiments, the developer surface uses facial recognition to authenticate the developer expert at all times. In an example of use, all code that is typed by the developer expert is tagged with an authentication that is verified at the time each keystroke is made. Accordingly, if code is copied, the source of the copied code may be quickly determined. The developer surface 138 further provides a secure environment for developer experts to complete their assigned tasks.

The code engine 140 is a portion of a code platform 150 that assembles all the building block components by the build card based on the features associated with the build card. The code platform 150 uses language-specific translators (LSTs) to generate code that follows a repeatable template. In various embodiments, the LSTs are pretested to be deployable and human understandable. The LSTs are configured to accept markers that identify the customization portion of a project. Changes may be automatically injected into the portions identified by the markers. Thus, a user may implement custom features while retaining product stability and reusability. In an example of use, new or updated features may be rolled out into an existing assembled project by adding the new or updated features to the marked portions of the LSTs.

In an exemplary embodiment, the LSTs are stateless and work in a scalable Kubernetes Job architecture which allows for limitless scaling that provide the throughput based on the volume of builds coming in through a queue system. This stateless architecture may also enable support for multiple languages in a plug & play manner.

The cloud allocation tool 148 manages cloud computing that is associated with computer readable specifications. For example, the cloud allocation tool 148 assesses computer readable specifications to predict a cost and resources to complete them. The cloud allocation tool 148 then creates cloud accounts based on the prediction and facilitates payments over the lifecycle of the computer readable specification.

The merge engine 152 is a tool that is responsible for automatically merging the design code with the functional code. The merge engine 152 consolidates styles and assets in one place allowing experts to easily customize and consume the generated code. The merge engine 152 may handle navigations that connect different screens within an application. It may also handle animations and any other interactions within a page.

The UI engine 142 is a design-to-code product that converts designs into browser ready code. In an exemplary embodiment, the UI engine 142 converts designs such as those made in Sketch into React code. The UI engine may be configured to scale generated UI code to various screen sizes without requiring modifications by developers. In an example of use, a design file may be uploaded by a developer expert to designer surface 144 whereby the UI engine automatically converts the design file into a browser ready format.

The visual QA 154 automates the process of comparing design files with actual generated screens and identifies visual differences between the two. Thus, screens generated by the UI engine 142 may be automatically validated by the visual QA 154 system. In various embodiments, a pixel to pixel comparison is performed using computer vision to identify discrepancies on the static page layout of the screen based on location, color contrast and geometrical diagnosis of elements on the screen. Differences may be logged as bugs by scheduler 120 so they can be reviewed by expert developers.

In an exemplary embodiment, visual QA 154 implements an optical character recognition (OCR) engine to detect and diagnose text position and spacing. Additional routines are then used to remove text elements before applying pixel-based diagnostics. At this latter stage, an approach based on similarity indices for computer vision is employed to check element position, detect missing/spurious objects in the UI and identify incorrect colors. Routines for content masking are also implemented to reduce the number of false positives associated with the presence of dynamic content in the UI such as dynamically changing text and/or images.

The visual QA 154 system may be used for computer vision, detecting discrepancies between developed screens, and designs using structural similarity indices. It may also be used for excluding dynamic content based on masking and removing text based on optical character recognition whereby text is removed before running pixel-based diagnostics to reduce the structural complexity of the input images.

The designer surface 144 connects designers to a project network to view all of their assigned tasks as well as create or submit customer designs. In various embodiments, computer readable specifications include prompts to insert designs. Based on the computer readable specification, the designer surface 144 informs designers of designs that are expected of them and provides for easy submission of designs to the computer readable specification. Submitted designs may be immediately available for further customization by expert developers that are connected to a project network.

Similar to building block components 134, the design library 156 contains design components that may be reused across multiple computer readable specifications. The design components in the design library 156 may be configured to be inserted into computer readable specifications, which allows designers and expert developers to easily edit them as a starting point for new designs. The design library 156 may be linked to the designer surface 144, thus allowing designers to quickly browse pretested designs for user and/or editing.

Tracker 146 is a task management tool for tracking and managing granular tasks performed by experts in a project network. In an example of use, common tasks are injected into tracker 146 at the beginning of a project. In various embodiments, the common tasks are determined based on prior projects, completed, and tracked in the software building system 100.

The run entities 108 contain entities that all users, partners, expert developers, and designers use to interact within a centralized project network. In an exemplary embodiment, the run entities 108 include tool aggregator 160, cloud system 162, user control system 164, cloud wallet 166, and a cloud inventory module 168. The tool aggregator 160 entity brings together all third-party tools and services by users to build, run and scale their software project. For instance, it may aggregate software services from payment gateways and licenses such as Office 365. User accounts may be automatically provisioned for services without the hassle of integrating them one at a time. In an exemplary embodiment, users of the run entities 108 may choose from various services on demand to be integrated into their application. The run entities 108 may also automatically handle invoicing of the services for the user.

The cloud system 162 is a cloud platform that is capable of running any of the services in a software project. The cloud system 162 may connect any of the entities of the software building system 100 such as the code platform 150, developer surface 138, designer surface 144, catalogue 136, entity controller 126, specification builder 110, the interactor 112 system, and the prototype module 114 to users, expert developers, and designers via a cloud network. In one example, cloud system 162 may connect developer experts to an IDE and design software for designers allowing them to work on a software project from any device.

The user control system 164 is a system requiring the user to have input over all features of a final product in a software product. With the user control system 164, automation is configured to allow the user to edit and modify any features that are attached to a software project regardless as to the coding and design by developer experts and designer. For example, building block components 134 are configured to be malleable such that any customizations by expert developers can be undone without breaking the rest of a project. Thus, dependencies are configured so that no one feature locks out or restricts development of other features.

Cloud wallet 166 is a feature that handles transactions between various individuals and/or groups that work on a software project. For instance, payment for work performed by developer experts or designers from a user is facilitated by cloud wallet 166. A user has to set up a single account in cloud wallet 166 whereby cloud wallet handles payments of all transactions.

A cloud allocation tool 148 may automatically predict cloud costs that would be incurred by a computer readable specification. This is achieved by consuming data from multiple cloud providers and converting it to domain specific language, which allows the cloud allocation tool 148 to predict infrastructure blueprints for customers' computer readable specifications in a cloud agnostic manner. It manages the infrastructure for the lifecycle of the computer readable specification (from development to after care) which includes creation of cloud accounts, in predicted cloud providers, along with setting up CI/CD to facilitate automated deployments.

The cloud inventory module 168 handles storage of assets on the run entities 108. For instance, building block components 134 and assets of the design library are stored in the cloud inventory entity. Expert developers and designers that are onboarded by onboarding system 116 may have profiles stored in the cloud inventory module 168. Further, the cloud inventory module 168 may store funds that are managed by the cloud wallet 166. The cloud inventory module 168 may store various software packages that are used by users, expert developers, and designers to produce a software product.

Figure 2:
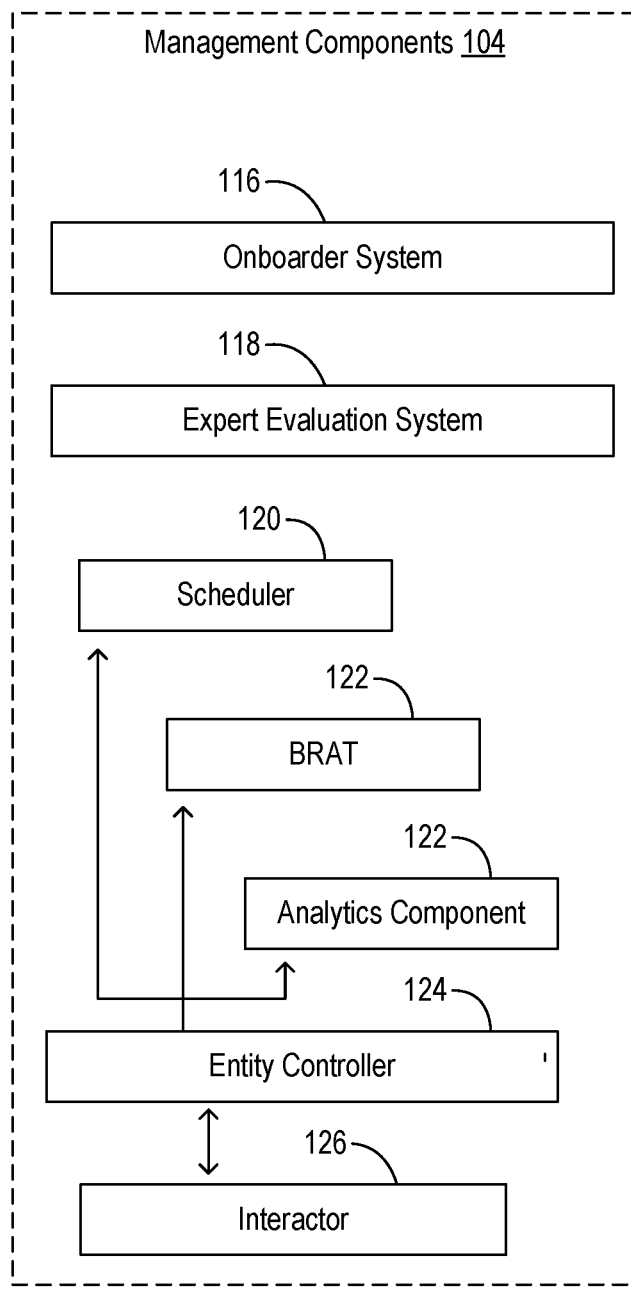
FIG. 2 is a schematic illustrating an embodiment of the management components of the disclosed subject matter.

Referring to FIG. 2, FIG. 2 is a schematic 200 illustrating an embodiment of the management components 104 of the software building system 100. The management components 104 provide for continuous assessment and management of a project through its entities and systems. The central hub of the management components 104 is entity controller 126. In an exemplary embodiment, core functionality of the entity controller 126 system comprises the following: display computer readable specifications configurations, provide statuses of all computer readable specifications, provide toolkits within each computer readable specification, integration of the entity controller 126 with tracker 146 and the onboarding system 116, integration code repository for repository creation, code infrastructure creation, code management, and expert management, customer management, team management, specification and demonstration call booking and management, and meetings management.

In an exemplary embodiment, the computer readable specification configuration status includes customer information, requirements, and selections. The statuses of all computer readable specifications may be displayed on the entity controller 126, which provides a concise perspective of the status of a software project. Toolkits provided in each computer readable specification allow expert developers and designers to chat, email, host meetings, and implement 3rd party integrations with users. Entity controller 126 allows a user to track progress through a variety of features including but not limited to tracker 146, the UI engine 142, and the onboarding system 116. For instance, the entity controller 126 may display the status of computer readable specifications as displayed in tracker 146. Further, the entity controller 126 may display a list of experts available through the onboarding system 116 at a given time as well as ranking experts for various jobs.

The entity controller 126 may also be configured to create code repositories. For example, the entity controller 126 may be configured to automatically create an infrastructure for code and to create a separate code repository for each branch of the infrastructure. Commits to the repository may also be managed by the entity controller 126.

Entity controller 126 may be integrated into scheduler 120 to determine a timeline for jobs to be completed by developer experts and designers. The BRAT 122 system may be leveraged to score and rank experts for jobs in scheduler 120. A user may interact with the entity controller 126 features through the analytics component 124 dashboard. Alternatively, a user may interact with the entity controller 126 features via the interactive conversation in the interactor 112 system.

Entity controller 126 may facilitate user management such as scheduling meetings with expert developers and designers, documenting new software such as generating an API, and managing dependencies in a software project. Meetings may be scheduled with individual expert developers, designers, and with whole teams or portions of teams.

Machine learning algorithms may be implemented to automate resource allocation in the entity controller 126. In an exemplary embodiment, assignment of resources to groups may be determined by constrained optimization by minimizing total project cost. In various embodiments a health state of a project may be determined via probabilistic Bayesian reasoning whereby a causal impact of different factors on delays using a Bayesian network are estimated.

Figure 3:
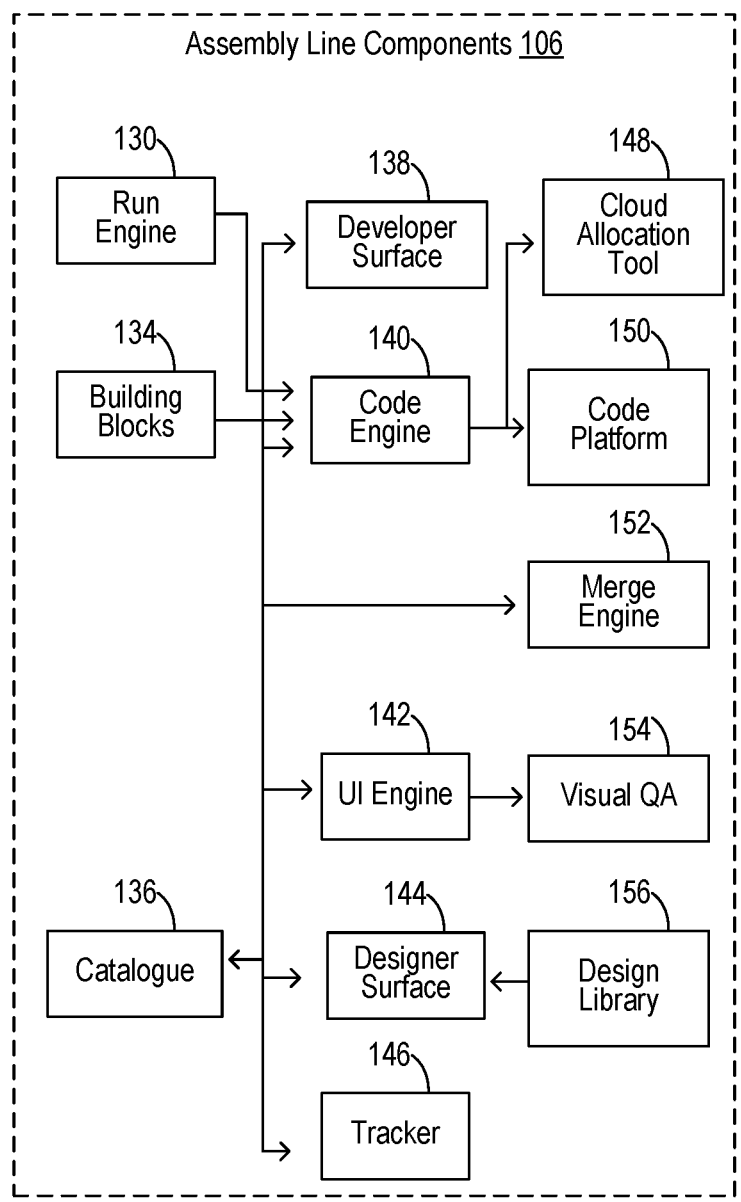
FIG. 3 is a schematic illustrating an embodiment of an assembly line and surfaces of the disclosed subject matter.

Referring to FIG. 3, FIG. 3 is a schematic 300 illustrating an embodiment of the assembly line components 106 of the software building system 100. The assembly line components 106 support the various features of the management components 104. For instance, the code platform 150 is configured to facilitate user management of a software project. The code engine 140 allows users to manage the creation of software by standardizing all code with pretested building block components. The building block components contain LSTs that identify the customizable portions of the building block components 134.

The machine readable specifications may be generated from user specifications. Like the building block components, the computer readable specifications are designed to be managed by a user without software management experience. The computer readable specifications specify project goals that may be implemented automatically. For instance, the computer readable specifications may specify one or more goals that require expert developers. The scheduler 120 may hire the expert developers based on the computer readable specifications or with direction from the user. Similarly, one or more designers may be hired based on specifications in a computer readable specification. Users may actively participate in management or take a passive role.

A cloud allocation tool 148 is used to determine costs for each computer readable specification. In an exemplary embodiment, a machine learning algorithm is used to assess computer readable specifications to estimate costs of development and design that is specified in a computer readable specification. Cost data from past projects may be used to train one or more models to predict costs of a project.

The developer surface 138 system provides an easy to set up platform within which expert developers can work on a software project. For instance, a developer in any geography may connect to a project via the cloud system 162 and immediately access tools to generate code. In one example, the expert developer is provided with a preconfigured IDE as they sign into a project from a web browser.

The designer surface 144 provides a centralized platform for designers to view their assignments and submit designs. Design assignments may be specified in computer readable specifications. Thus, designers may be hired and provided with instructions to complete a design by an automated system that reads a computer readable specification and hires out designers based on the specifications in the computer readable specification. Designers may have access to pretested design components from a design library 156. The design components, like building block components, allow the designers to start a design from a standardized design that is already functional.

The UI engine 142 may automatically convert designs into web ready code such as React code that may be viewed by a web browser. To ensure that the conversion process is accurate, the visual QA 154 system may evaluate screens generated by the UI engine 142 by comparing them with the designs that the screens are based on. In an exemplary embodiment, the visual QA 154 system does a pixel to pixel comparison and logs any discrepancies to be evaluated by an expert developer.

Figure 4:
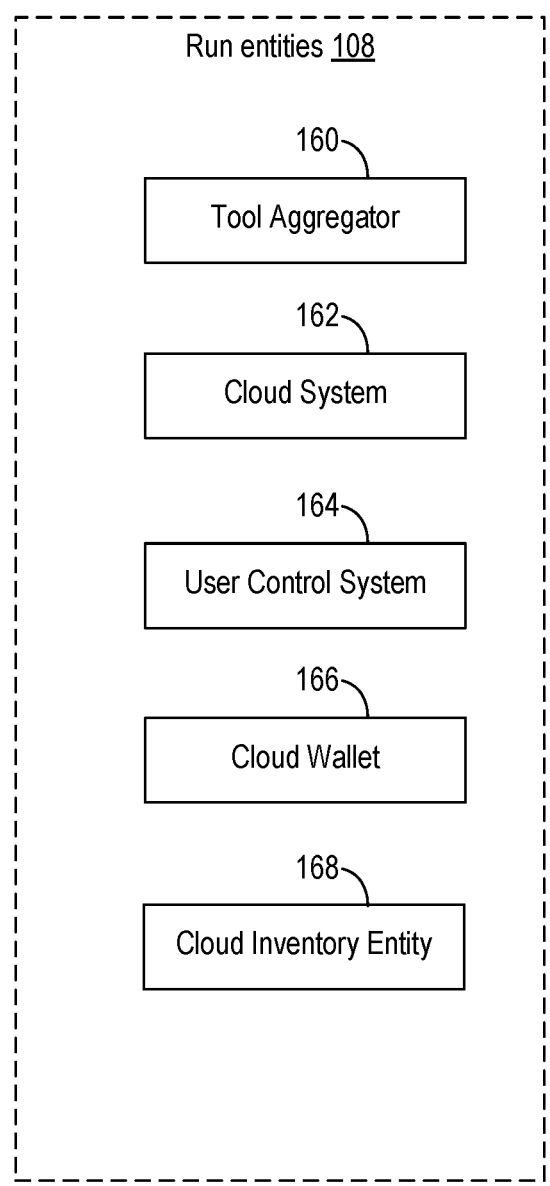
FIG. 4 is a schematic illustrating an embodiment of the run entities of the disclosed subject matter.

Referring to FIG. 4, FIG. 4 is a schematic 400 illustrating an embodiment of the run entities 108 of the software building system. The run entities 108 provides a user with 3rd party tools and services, inventory management, and cloud services in a scalable system that can be automated to manage a software project. In an exemplary embodiment, the run entities 108 is a cloud-based system that provides a user with all tools to run a project in a cloud environment.

For instance, the tool aggregator 160 automatically subscribes with appropriate 3rd party tools and services and makes them available to a user without a time consuming and potentially confusing set up. The cloud system 162 connects a user to any of the features and services of the software project through a remote terminal. Through the cloud system 162, a user may use the user control system 164 to manage all aspects of a software project including conversing with an intelligent AI in the interactor 112 system, providing user specifications that are converted into computer readable specifications, providing user designs, viewing code, editing code, editing designs, interacting with expert developers and designers, interacting with partners, managing costs, and paying contractors.

A user may handle all costs and payments of a software project through cloud wallet 166. Payments to contractors such as expert developers and designers may be handled through one or more accounts in cloud wallet 166. The automated systems that assess completion of projects such as tracker 146 may automatically determine when jobs are completed and initiate appropriate payment as a result. Thus, accounting through cloud wallet 166 may be at least partially automated. In an exemplary embodiment, payments through cloud wallet 166 are completed by a machine learning AI that assesses job completion and total payment for contractors and/or employees in a software project.

Cloud inventory module 168 automatically manages inventory and purchases without human involvement. For example, cloud inventory module 168 manages storage of data in a repository or data warehouse. In an exemplary embodiment, it uses a modified version of the knapsack algorithm to recommend commitments to data that it stores in the data warehouse. Cloud inventory module 168 further automates and manages cloud reservations such as the tools providing in the tool aggregator 160.

Figure 5:
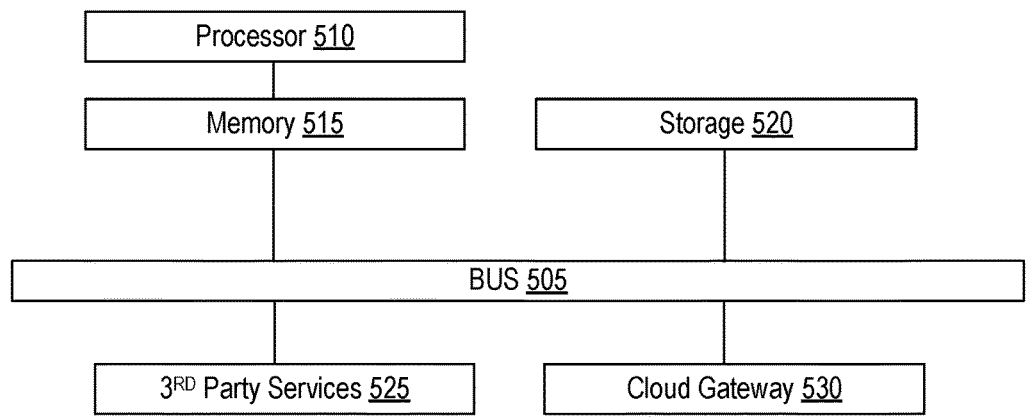
FIG. 5 is a schematic illustrating the computing components that may be used to implement various features of embodiments described in the disclosed subject matter.

Referring to FIG. 5, FIG. 5 is a schematic illustrating a computing system 500 that may be used to implement various features of embodiments described in the disclosed subject matter. The terms components, entities, modules, surface, and platform, when used herein, may refer to one of the many embodiments of a computing system 500. The computing system 500 may be a single computer, a co-located computing system, a cloud-based computing system, or the like. The computing system 500 may be used to carry out the functions of one or more of the features, entities, and/or components of a software project.

The exemplary embodiment of the computing system 500 shown in FIG. 5 includes a bus 505 that connects the various components of the computing system 500, a processor 510 coupled to a memory 515, and a storage 520. The processor 510 is an electronic circuit that executes instructions that are passed to it from the memory 515. Executed instructions are passed back from the processor 510 to the memory 515. The interaction between the processor 510 and memory 515 allow the computing system 500 to perform computations, calculations, and various computing to run software applications.

Examples of the processor 510 include central processing units (CPUs), graphics processing units (GPUs), field programmable gate arrays (FPGAs), complex programmable logic devices (CPLDs), and application specific integrated circuits (ASICs). The memory 515 stores instructions that are to be passed to the processor 510 and receives executed instructions from the processor 510. The memory 515 also passes and receives instructions from all other components of the computing system 500 through the bus 505. For example, a computer monitor may receive images from the memory 515 for display. Examples of memory include random access memory (RAM) and read only memory (ROM). RAM has high speed memory retrieval and does not hold data after power is turned off. ROM is typically slower than RAM and does not lose data when power is turned off.

The storage 520 is intended for long term data storage. Data in the software project such as computer readable specifications, code, designs, and the like may be saved in a storage 520. The storage 520 may be stored at any location including in the cloud. Various types of storage include spinning magnetic drives and solid-state storage drives.

The computing system 500 may connect to other computing systems in the performance of a software project. For instance, the computing system 500 may send and receive data from 3rd party services such as Office 365 and Adobe. Similarly, users may access the computing system 500 via a cloud gateway 530. For instance, a user on a separate computing system may connect to the computing system 500 to access data, interact with the run entities 108, and even use 3rd party services 525 via the cloud gateway.

Figure 6:
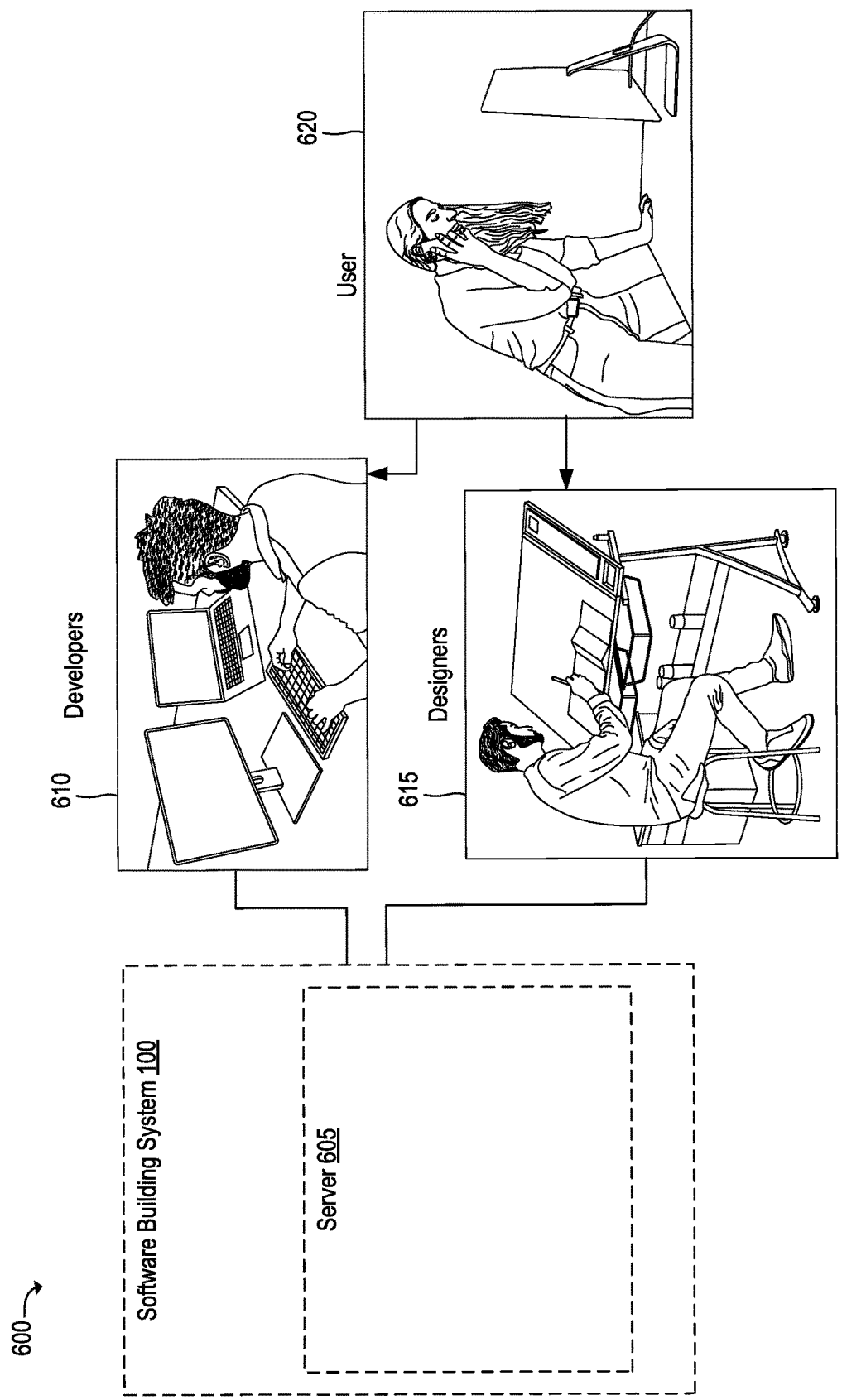
FIG. 6 is a schematic illustrating a system in an embodiment of the disclosed subject matter.

Referring to FIG. 6, FIG. 6 is a schematic diagram of a system 600 in an embodiment of the disclosed subject matter. In an exemplary embodiment, the system 600 comprises the software building system 100, one or more users 620, one or more developers 610, and one or more designers 615. In the embodiment shown for the system 600, the software building system 100 comprises a server 605. The server 605 may be a computing system 500.

In the exemplary embodiment shown in FIG. 6, the server 605 is in communication with one or more users 620, one or more developers 610, and one or more designers 615. Various embodiments may include additional personnel or computing resources that produce code, content, or the like for the software application. For example, the server 605 may be in communication with one or more quality assurance engineers to assemble, test, and package the software application.

In an exemplary embodiment, the server 605 may transfer allocating units to the users 620. The users 620, as used herein, may be referred to an individual person, small business owner/manager, large business owner/manager, hotel manager, restaurant manager, and the like. The users 620 may distribute the allocating units to various personnel, computing resources, or other services to work on the software application. In an exemplary embodiment, allocating units may be referred to as tokens, points, or the like. As used herein, the allocating units are commonly referred to as points.

In an exemplary embodiment, the users 620 may distribute points to developers 610 and designers 615. The developers 610, as used herein, may be referred to as experts, developer experts, coders, software engineers, engineers, and the like. In various embodiments, the one or more developers 610 may be supplied by an onboarding system 116. In various embodiments, the users 620 contact and selects the one or more developers 610.

In an exemplary embodiment, the BRAT 122 may determine the one or more developers 610 for a software project. In one implementation, the BRAT 122 may determine the one or more developers 610 for the users 620 based on multiple qualities of a software application and/or multiple software application visions. For instance, the BRAT 122 may determine the one or more developers 610 for a small-size software application, a medium-sized software application, and a large medium-sized software application. In another instance, the BRAT 122 may determine the one or more developers 610 for a consumer-based software application and an industry-based software application where a consumer-based software application has a focus on large volume consumer communication and an industry-based software application has a focus on intimate communication with a small number of industries.

The designers 615, as used herein, may be referred to as artists, web designers, and the like. The designers 615 may have different skill levels and different skill areas. In an exemplary embodiment, the BRAT 122 may provide the one or more designers 615 along with their talent set. A user may use the provided information on designers to allocate resources to designers 615 in a way that promotes the users 620 vision of the software application.

The system 600 allows the users 620 freedom to distribute points according to their vision and limited resources for the software application project. Accordingly, the system 600 maximizes creativity at a high level by allowing the users 620 strategic control over high-level management decisions in the software project. The users 620 is not limited to arbitrary or abstract criteria for selecting developers or designers or how to allocate points to developers or designers. Even where the cloud allocation tool 148 determines a number of points for the users 620, the system 600 provides for the users 620 to distribute those points without limitations.

The distribution of points from the users 620 to developers 610, designers 615, or the like is a signal to the developers 610 and designers 615 to provide an amount of work commensurate with the number of points transferred. The server 605 may provide lower management level decisions to the developers 610, designers 615, or other personnel or computing resources based on the points allocated to them by the users 620. In an exemplary embodiment, the server 605 may provide payment to the developers 610 and designers 615 based on the points distributed to them.

Figure 7:
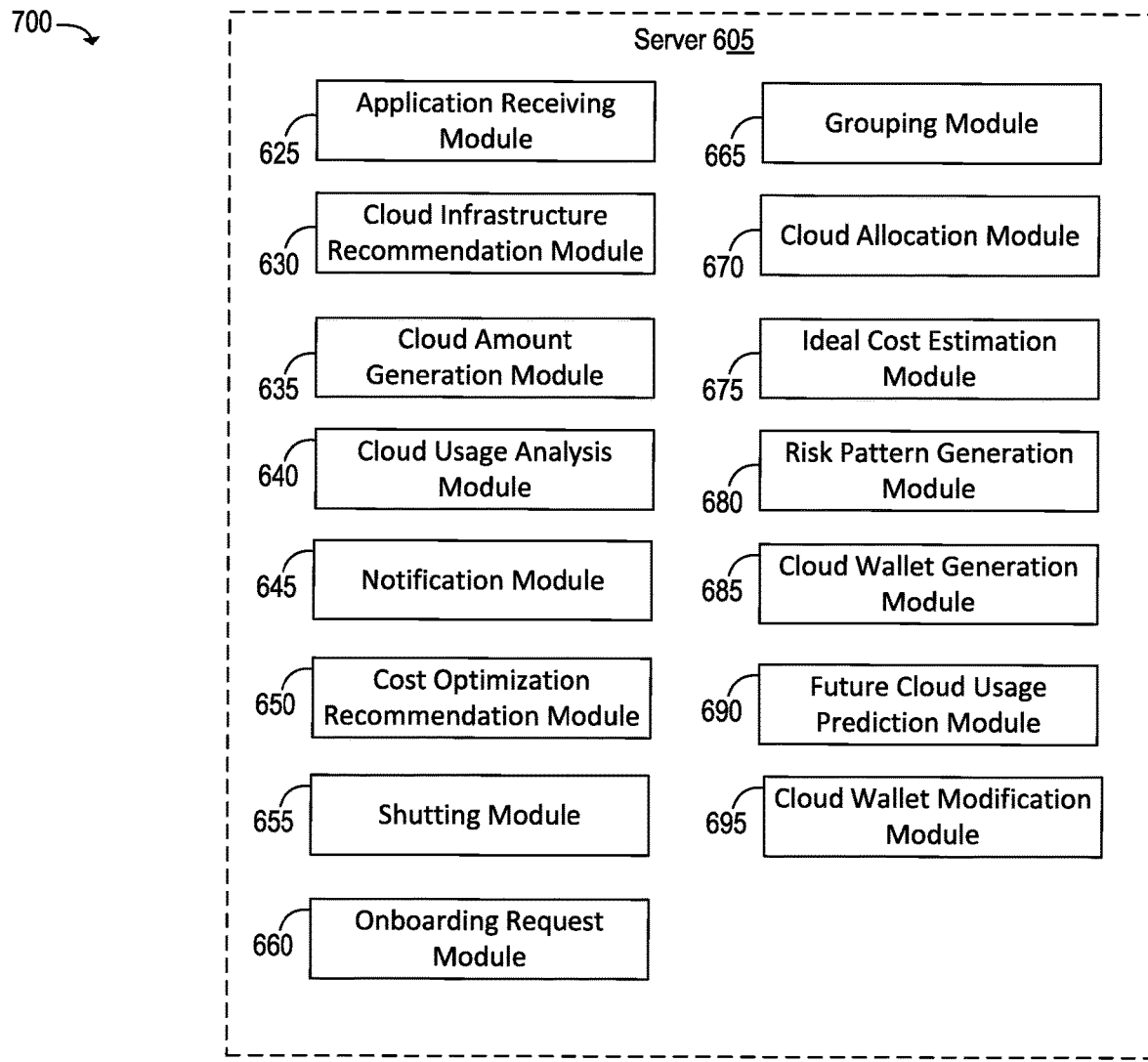
FIG. 7 is a schematic illustrating an exploded view of the server of the system of FIG. 6 in an embodiment of the disclosed subject matter.

Referring to FIG. 7, FIG. 7 illustrates an exploded view 700 of the server 605 of the system 600 of FIG. 6 in an embodiment of the disclosed subject matter. As shown, the server 605 includes an application receiving module 625, a cloud infrastructure recommendation module 630, a cloud amount generation module 635, a cloud usage analysis module 640, a notification module 645, a cost optimization recommendation module 650, a shutting module 655, an onboarding request module 660, a grouping module 665, a cloud allocation module 670, an ideal cost estimation module 675, a risk pattern generation module 680, a cloud wallet generation module 685, a future cloud usage prediction module 690, and a cloud wallet modification module 695. The functionality of each module is explained in further detail below.

In an exemplary embodiment, the application receiving module 625 receives a cloud account opening application. The request for creating the one or more cloud accounts may be made by the one or more developers 610, one or more designers 615, or the one or more users 620. The cloud accounts may be created for personal purposes, business purposes, entertainment purposes, legal purposes, and the like. The application receiving module 625 further stores the information received for the one or more developers 610, designers 615, or users 620 in a database (not shown). The information may include personal information, business-related information, contact information, reason for opting for cloud services, products/services offered, future goals, and the like.

In an exemplary embodiment, the cloud infrastructure recommendation module 630 recommends one or more cloud infrastructures for the one or more developers 610, designers 615, or users 620 once the cloud account opening application is received from the application receiving module 625. The one or more cloud infrastructures may be cloud platforms known to a person skilled in the art. For instance, the cloud infrastructure recommendation module 630 may make the cloud infrastructure recommendations based on one or more parameters. The one or more parameters may include requirements provided by the one or more developers 610, designers 615, or users 620 in the cloud account opening application, a project size, supporting technologies, features offered, a cloud architecture, a cloud security, and a deployment timeline.

The requirements may include information such as details (features, functions, and tasks) associated with the one or more projects to be hosted on the cloud infrastructures, the size/complexity of the project (the developers 610 or designers 615 allocated for each project), the reasons for hosting the projects on cloud, cloud storage required for each project, types of cloud computing services preferred, future goals, and the like. In an example, if the project being hosted is an e-commerce application, the features may include a login feature, search feature, product description feature, payment feature, feedback feature, and the like. The functions may include mobile friendly design, easy-to-use navigation, high quality pictures, and the like. The tasks may include design, development, testing, execution, and the like. The supporting technologies correspond to cloud infrastructures that are able to support or cope with the requirements provided by the users 620. In an example, if the project being hosted is an e-commerce application, the cloud infrastructure recommendation module 630 determines cloud infrastructures that have a suitable architecture, standards, and services that would be able to cope with the e-commerce application.

Further, the could infrastructure recommendation module 630 analyses deployment durations and deployment locations (if any) and compares those durations with standard durations of other cloud infrastructures. Based on the deployment comparison, the cloud infrastructure recommendation module 630 makes recommendations to choose cloud infrastructures offering better deployments than the current cloud platforms used by the one or more developers 610, designers 615, or users 620. The cloud infrastructure recommendation module 630 also analyzes a security level for each of the projects. The security level may be analyzed based on factors such as project investments, project launch patterns, project deadlines, project storage, a project confidentiality level, and the like.

For each recommended cloud infrastructure, the cloud infrastructure recommendation module 630 generates a cloud score. The cloud score is used as a differentiating factor between each cloud infrastructure and is determined once the one or more parameters have been analyzed. The cloud score may be represented as a percentage, a graph, a chart, a numerical value, and the like. The one or more cloud infrastructures may be presented to the one or more developers 610, designers 615, or users 620 using a dashboard. The dashboard is capable of ranking the cloud infrastructures based on the determined cloud score, where the cloud infrastructures having a greater cloud score will be placed above the ones having a lower cloud score.

In an exemplary embodiment, the cloud amount generation module 635 generates a fixed cloud amount for the one or more developers 610, designers 615, or users 620 to pay upon selection of at least one cloud infrastructure recommended by the cloud infrastructure recommendation module 630. The fixed cloud amount or monthly cloud cost may be a one-time recharge amount having a low threshold. In an example, the low threshold may be $100, $150, $200, and the like. The fixed cloud amount is less and is useful for users 620 who have a low financial spending ability. Such people may make cloud payments without having to pay a large amount or a fixed amount. The fixed cloud amount may be paid using one or more modes of payment such as credit card, debit card, internet banking, UPI payment, and the like.

In an exemplary embodiment, the cloud usage analysis module 640 analyzes a cloud usage for each cloud infrastructure selected and used by the one or more developers 610, designers 615, or users 620. The cloud usage may be analyzed for a threshold time period. In an example, the threshold time period may be one month, three months, six months, nine months, one year, and the like. The cloud usage corresponds to reviewing and observing a storage usage amount and cost usage amount for the one or more developers 610, designers 615, or users 620 while hosting their respective projects. The cloud usage monitoring may be an automated process that reviews/analyses an operational capacity and a health status of the one or more cloud infrastructures. Further, the cloud usage analysis module 640 may present the cloud usage using a number value based on the fixed cloud amount paid by the one or more developers 610, designers 615, or users 620. In an example, if the fixed amount is $100 and the cloud amount used is $27. Thus, the cloud usage is 27% and 73% usage is still left for this month, which is presented to the one or more developers 610, designers 615, or users 620.

In an exemplary embodiment, the notification module 645 notifies the one or more developers 610, designers 615, or users 620 when their fixed cloud amount exceeds a predetermined threshold. The predetermined threshold may be automatically set by the notification module 645 and is generally set to a value close to the fixed cloud amount. In an example, if the fixed cloud amount for a month is $100, then the predetermined threshold may be set to $80. The predetermined threshold is set to a value that differs less than the total fixed amount. Further, the notification module 645 may notify the one or more developers 610, designers 615, or users 620 once the fixed cloud amount has exceeded the threshold using a written message, a voice message, an email message, and the like.

In an example, the written message may be presented to the one or more developers 610, designers 615, or users 620 stating that 'Please watch your cloud usage', 'Your cloud amount is getting almost used', 'Your cloud usage threshold has been exceeded, please keep a watch', and the like. The written message may be in a chat bot format that prompts the messages to the one or more developers 610 one their respective device(s) while they are working. The developers 610, designers 615, or users 620 may then reply back to the message(s) using the chatbot. Further, the voice message may be spoken out to the one or more developers 610, designers 615, or users 620 while they are using or have logged in to the cloud platform. This may help in grabbing their attention more quickly. The one or more developers 610, designers 615, or users 620 may reply back using voice or typing in the chatbot.

In an exemplary embodiment, the cost optimization recommendation module 650 determines a cost optimization recommendation for the developers 610, designers 615, or users 620 based on the cloud usage analyzed by the cloud usage analysis module 640. For instance, the cost optimization recommendation module 650 may take factors such as the fixed cloud amount, a remaining cloud usage for a threshold time period, a number of instances in which the fixed cloud amount exceeded the predetermined threshold, project size, project requirements, and the like for determining the cost optimization recommendation.

The remaining cloud usage corresponds to the usage amount or usage percentage left over for the threshold time period (for example, one month, two months, three months, six months, and the like) analyzed by the cloud usage analysis module 640. In an example, if the cloud usage is 60% for one month, then the remaining cloud usage for that month would be 40%. The remaining cloud usage is then compared with a usage threshold, which may be automatically set. The cost optimization recommendation module 650 considers a number of instances in which the remaining cloud usage is less than the usage threshold and a number of instances in which the fixed cloud amount exceeds the predetermined threshold. In an example, if the remaining cloud usage is less than the usage threshold for more than 3 instances and the fixed cloud amount exceeded the predetermined threshold for more that 3-4 instances, this gives an indication that the current cloud infrastructure used by the developers 610, designers 615, or users 620 is not coping up with the current projects worked on. This may indicate that the developers 610, designers 615, or users 620 would need more space or bandwidth for hosting their projects.

The cost optimization recommendation module 650 also takes factors such as the project size, the project requirements, and project deadlines into consideration while making the cost optimization recommendations. For instance, the developers 610, designers 615, or users 620 may face requirements of excess staff, training, and time to complete few projects that are complex or have strict deadlines. In such cases, the cost optimization recommendation module 650 may then recommend purchasing additional storage, recommend other cloud infrastructures, and determine an ideal recharge amount due next month based on the cloud usage. The ideal recharge amount may be presented to the developers 610, designers 615, or users 620 on their device(s), where they will be able to recharge with a click of a button.

In case the developers 610, designers 615, or users 620 have queries with respect to the ideal recharge amount and the other recommendations provided by the cost optimization recommendation module 650, they may provide their feedback. The cost optimization recommendation module 650 takes the feedback provided into consideration and may then modify the cost optimization previously recommended. Thus, the cost optimization recommendation module 650 is capable of providing cloud cost regulation recommendations based on the cloud usage history analysis, cloud cost analysts, and project requirements. This process is an automated process without having the developers 610, designers 615, or users 620 to manually check the following cloud parameters.

In an exemplary embodiment, the shutting module 655 is capable of automatically shutting down the device(s) in which the one or more cloud infrastructures are currently running. For instance, the device(s) are instantly shut down when the number of instances in which the remaining cloud usage is less than the usage threshold and the number of instances in which the fixed cloud amount exceeds the predetermined threshold is 2-3 times. Automatic shutting down is another way to inform the developers 610, designers 615, or users 620 that their cloud usage is being exceeded and they have to keep a watch regarding their usage.

In an exemplary embodiment, the onboarding request module 660 receives a request for onboarding the one or more developers 610 or designers 615 to complete the one or more projects. For instance, the one or more developers 610 or designers 615 may be onboarded based on a selection criteria. The selection criteria includes a background of the one or more developers 610, works performed by the one or more developers 610, and a performance of the one or more developers 610 in an expert onboarding assessment. The expert onboarding assessment relates to a test that is automatically generated by the onboarding request module 660 that evaluates a skillset of the one or more developers 610. Thus, the onboarding request module 660 is capable of analyzing a background and work experience of the one or more developers 610, and accordingly generates an appropriate expert onboarding assessment for them to take.

In an exemplary embodiment, the grouping module 665 groups the one or more developers 610 into one or more batches to complete each project. The grouping module 665 performs the grouping based on a grouping criteria. The grouping criteria is based on a project importance, a project deadline, a project complexity, a staff requirement, and the performance of the one or more developers in the expert onboarding assessment. The performance in the expert onboarding assessment is an important measure that the grouping module 665 taken while adding the developers 610 to the batches. The one or more batches may include a junior batch, an intermediate batch, and an advanced batch. The one or more developers 610 in the junior batch would be allocated projects or would be assigned to do tasks of a project having less complexity. The one or more developers 610 in the intermediate batch would be allocated project tasks having a slightly higher complexity, and the developers 610 in the advanced batch would be allocated project tasks having a high complexity and would require experience for timely completion.

Further, the one or more developers 610 may also be moved to higher batches (junior batch to intermediate batch or intermediate batch to advanced batch). This is based on their current performance. The performance of the one or more developers 610 in each batch is evaluated and reported to the one or more users 620 or their project managers. In case of a performance improvement, they may be shifted to a higher batch. In case their performance is not that good or has to be looked into, they may be shifted to a lower batch. Such evaluation ensures that the developers 610 in each batch are able to duly perform their project duties, thereby enabling the projects to be timely completed.

In an exemplary embodiment, the cloud allocation module 670 allocates one or more cloud infrastructures for each batch. The one or more developers 610 in each batch would be able to commonly use one or more cloud infrastructures allocated for each batch. Thus, the developers 610 do not need to individually purchase or make payments for accessing the cloud infrastructures as the users 620/companies/ entities that have assigned the projects to the one or more developers 610 to work on provide the funding from there end. The cloud allocation module 670 performs the cloud infrastructure allocation for each batch based on one or more factors, such as the grouping criteria of the one or more developers 610, a project size, features offered, cloud architecture, cloud security, and the like.

Further, the cloud allocation module 670 generates a monthly cloud cost for each cloud infrastructure for each batch based on a usage pattern. The monthly cloud cost may also be determined based on the number of batches, a total cloud space allocation, a number of cloud infrastructures/ platforms required for hosting the projects, locations of the one or more developers 610 in each batch, and the like. The monthly cloud cost is to be payable on the last day of each month and may vary each month based on the cloud resources utilized. Further, the monthly cloud cost is directly proportional to the usage pattern analyzed by the cloud allocation module 670. If the usage pattern increases, the cloud cost for the following month will also increase. If the usage pattern decreases in the next month, the cloud cost will also accordingly decrease.

In an exemplary embodiment, the ideal cost estimation module 675 estimates an ideal cloud cost for the one or more cloud infrastructures in each batch. The ideal cloud cost corresponds to an estimated cloud cost for the following months. The ideal cloud cost may be estimated for a future threshold timespan. In an example, the future threshold timespan may be one month, three months, six months, nine months, and the like. The ideal cost may be determined based on one or more factors. For instance, the one or more factors a total number of batches, a time period usage, a total fund allocation, a bandwidth, and a previous usage history.

The total number of batches is allocated by the grouping module 665 based on the total number or a bandwidth of developers 610 available to work on the projects, the total number of projects, and a timeline for completing each project. The time period usage is determined by analyzing the cloud usage determined by the cloud usage analysis module 640. The ideal cost estimation module 675 obtains the time spend by the batches on each cloud infrastructure and compares these times with the times of other months. The total fund allocation corresponds to an amount of funds allocated to each of the developers 610 in each batch. The ideal cost estimation module 675 further computes an available balance of the developers 610 based on the cloud usage determined by the cloud usage analysis module 640. In case the available balance falls below zero, the account of the developers 610 is then suspended.

In an exemplary embodiment, the risk pattern generation module 680 determines a risk pattern for each of the developers 610 upon selection of at least one cloud infrastructure recommended by the cloud infrastructure recommendation module 630. The risk pattern is used to evaluate how much risk can be taken on each of the developers 610 while evaluating work to them. In an example, the risks may include cloud space allocation, funds allocation, project allocation, and the like. The risk pattern is determined based on one or more factors. The one or more factors may include a previous usage pattern of the one or more developers 610 analyzed by the cloud usage analysis module 640, a background of the one or more developers 610, a project complexity, a project deadline, and the like.

Based on the above-mentioned analyzed one or more factors, the risk pattern generation module 680 categorizes the one or more developers 610 into one or more risk groups based on their risk level. For instance, the one or more risk groups may include low risk, medium risk, and high risk. In an example, if the developers 610 are in the low-risk group, then they are allocated projects that are complex and have stricter deadlines when compared to the developers 610 in the other risk groups. Such grouping and analysis ensures that the developers 610 are allocated with appropriate projects, cloud spaces, and funds based on their historical data. This may thus prevent possibilities of excess cloud usage and expenditures.

In an exemplary embodiment, the cloud wallet generation module 685 generates a cloud wallet 166 based on the risk pattern determined by the risk pattern generation module 680. The developers 610 will be able to handle payment transactions using the cloud wallet 166 generated. Further, the cloud wallet generation module 685 also monitors a usage pattern or spend pattern of the cloud wallet 166 generated for each of the developers 610. For instance, the usage pattern or spend pattern may be monitored on a periodic basis (for example, 1 month, 3 months, 6 months, 9 months, 1 year, and the like). Based on the monitoring, the cloud wallet generation module 685 groups the developers 610 into a spending category. The spending category may include low spending, medium spending, and high spending. The cloud wallet generation module 685 groups the developers 610 into their respective category by comparing their usage pattern/spending pattern with a spending limit, where each spending category has a limit range (for example, below $10, between $11 and $25, above $50, and the like).

In an exemplary embodiment, the future cloud usage prediction module 690 predicts a future cloud usage for each of the developers 610 based on the usage pattern/spend pattern monitored by the cloud wallet generation module 685. For instance, the future cloud usage may be monitored for a threshold time period. In an example, the threshold time period may be one month, three months, six months, nine months, one year, and the like. The future cloud usage prediction module 690 predicts a forecasted billing amount for the current month and the forecasted billing amount for the following months. The future cloud usage or forecasted billing amount may be determined using a trained AI/ML model. One or more inputs, such as the usage pattern/spend pattern monitored by the cloud wallet generation module 685, changes in the project workflow, project deadlines, and the like may be fed to the trained AI/ML model.

The usage pattern/spend pattern is analyzed for the past few days, few weeks, or few months. The usage pattern/spend pattern may be represented using graphs and the future cloud usage prediction module 690 may use graph neural networks (GNN) to perform an interference of the data points. Based on the analysis, the future cloud usage prediction module 690 comes up with a shift pattern. The shift pattern corresponds to changes in the usage pattern/spend pattern between a certain time period (few days, few months). In case the cloud usage is observed to be increasing, the future cloud usage prediction module 690 determines the future or forecasted cloud amount based on differences obtained between the data points.

In an exemplary embodiment, the cloud wallet modification module 695 receives one or more inputs from the one or more developers 610 to modify the cloud wallet generated by the cloud wallet generation module 685. The one or more inputs may be provided by the developers 610 based on the risk pattern obtained by the risk pattern generation module 680. In an example, if the developers 610 feel that the cloud space allocated to them and the funds allocated to them are less, they may provide their feedback via a feedback button. In their feedback, they may state the reasons why they feel that they should be allocated with more cloud storage and funds.

The developers 610 may provide their feedback using a written message, voice message, email message, and the like. Their feedback is then reviewed by one or more authorized persons. In an example, the one or more authorized persons may be the one or more users 620. Once the one or more users 620 acknowledge their feedback, the cloud wallet of the one or more developers 610 or batches of the one or more developers 610 is instantly updated. Thus, the one or more developers 610 are provided with an option to interact with the system by providing their feedback/inputs in case they require additional cloud support.

Figure 8:
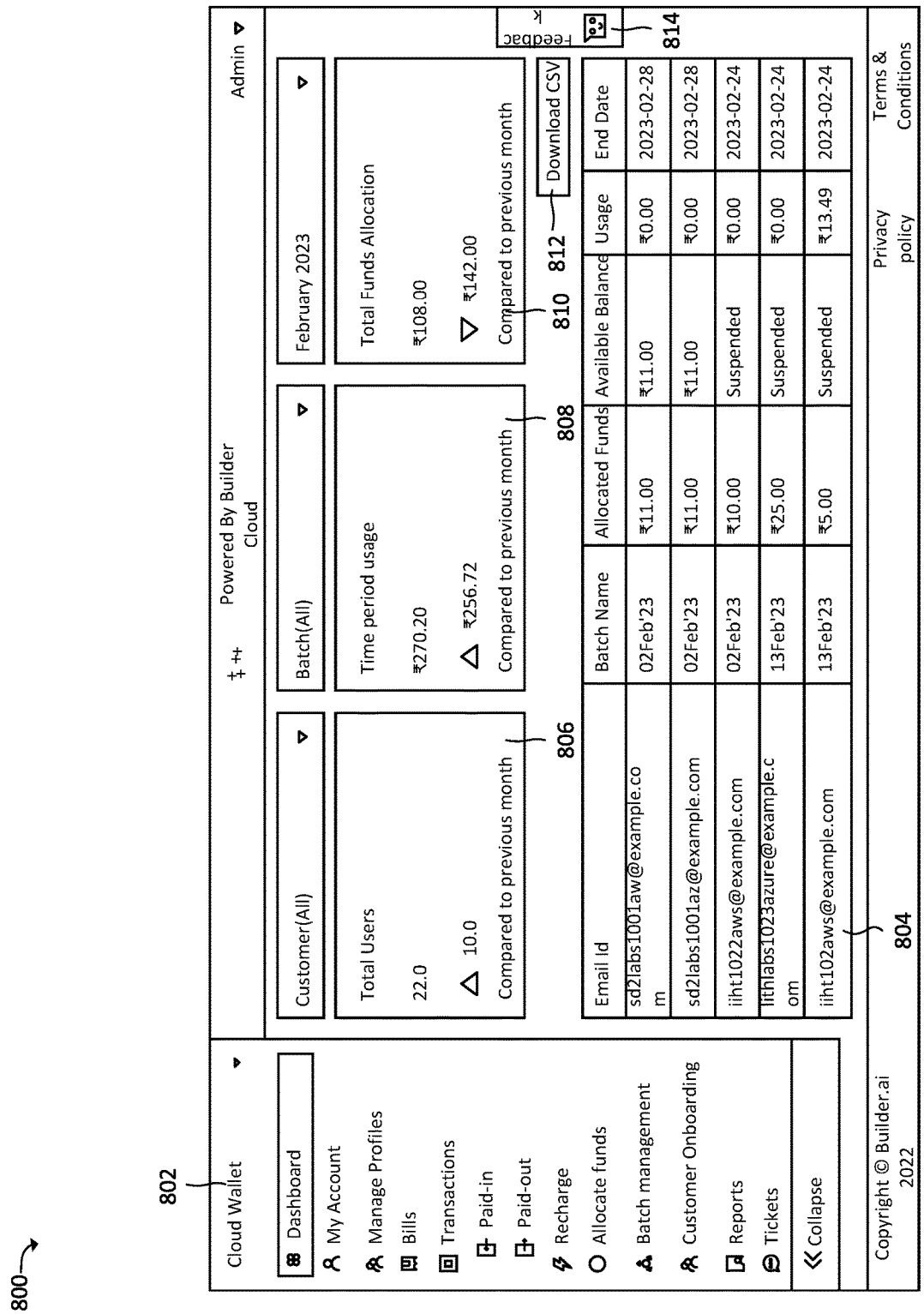
FIG. 8 illustrates a dashboard screen illustrating batch details in an embodiment of the disclosed subject matter.

Referring to FIG. 8, FIG. 8 illustrates a dashboard screen 800 illustrating batch details in an embodiment of the disclosed subject matter. As shown, the dashboard screen 800 includes a dropdown menu area 802, a batch details area 804, a user area 806, a usage area 808, a fund area 810, a download CSV button 812, and a feedback button 814. The dashboard screen 800 summarizes and presents details such as funds, usages, and names of the one or more batches to the one or more developers 610.

The dropdown menu area 802 includes one or more options that the developers 610, designers 615, or users 620 may choose to view on their respective device. For instance, the one or more options may include account, manage profiles, bills, transactions, recharge, allocate funds, batch management, customer onboarding, reports, tickets, and the like. The account and manage profiles options allows the developers 610 to view details with respect to the accounts created and linked to the cloud wallet. The bills are auto-generated and include an amount of money owned by the developers 610 based on their cloud usage. The transactions include the billing information paid by the developers 610 (paid-in and paid-out) for their cloud usages. The recharge and allocate funds enables the developers 610 or users 620 to add money to the cloud wallet by adding funds to the respective batches.

The batch management is responsible for managing the one or more batches and evaluating the one or more batches to meet quality goals. The customer onboarding enables the one or more developers 610 or users 620 to onboard others to work on the one or more projects. The developers 610 or designers 615 may be onboarded based on the selection criteria of the onboarding request module 660. The reports may refer to the cloud usage reports that includes information such as login date & time, logoff date & time, cloud usage details analyzed by the cloud usage analysis module 640, deployment details, and the like.

The batch details area 804 includes details regarding the developers 610 or users 620 in a respective batch. The details may include the email ID of the developers 610, the batch names, the allocated funds, available funds, funds usage, and end data. The details are presented in the batch details area 804 in a tabular column format. The user area 806 includes details including the time period usage or cloud usage analyzed by the cloud usage analysis module 640. The user area 806 also presents a comparison between the developers 610 or users 620 of the current month with the number in the previous month and mentions the difference between the usages. The usage area 808 includes details regarding the time period usage or the cloud usage analyzed by the cloud usage analysis module 640. The usage area 808 also presents a comparison between the usage of the current month with the usage in the previous month and mentions the difference between the usages. Further, the fund area 810 includes details regarding the total funds allocated for the one or more batches for a particular month. The fund area 810 also provides a comparison between the total funds allocated for the current month with the total funds allocated for the previous month.

The download CSV button 812 allows the details mentioned in the batch details area 804, the user area 806, the usage area 808, and the fund area 810 to be compressed and downloaded in a comma-separated value (CSV) file type. The CSV file type allows the following data to be saved in a table structured format. Further, the one or more developers 610 may click on the feedback button 814 to provide their feedback. The feedback may be provided using a written message, voice message, email message, and the like. Their feedback is then reviewed by one or more authorized persons. In an example, the one or more authorized persons may be the one or more users 620. Once the one or more users 620 acknowledge their feedback, the cloud wallet of the one or more developers 610 or batches of the one or more developers 610 is instantly updated.

Figure 9:
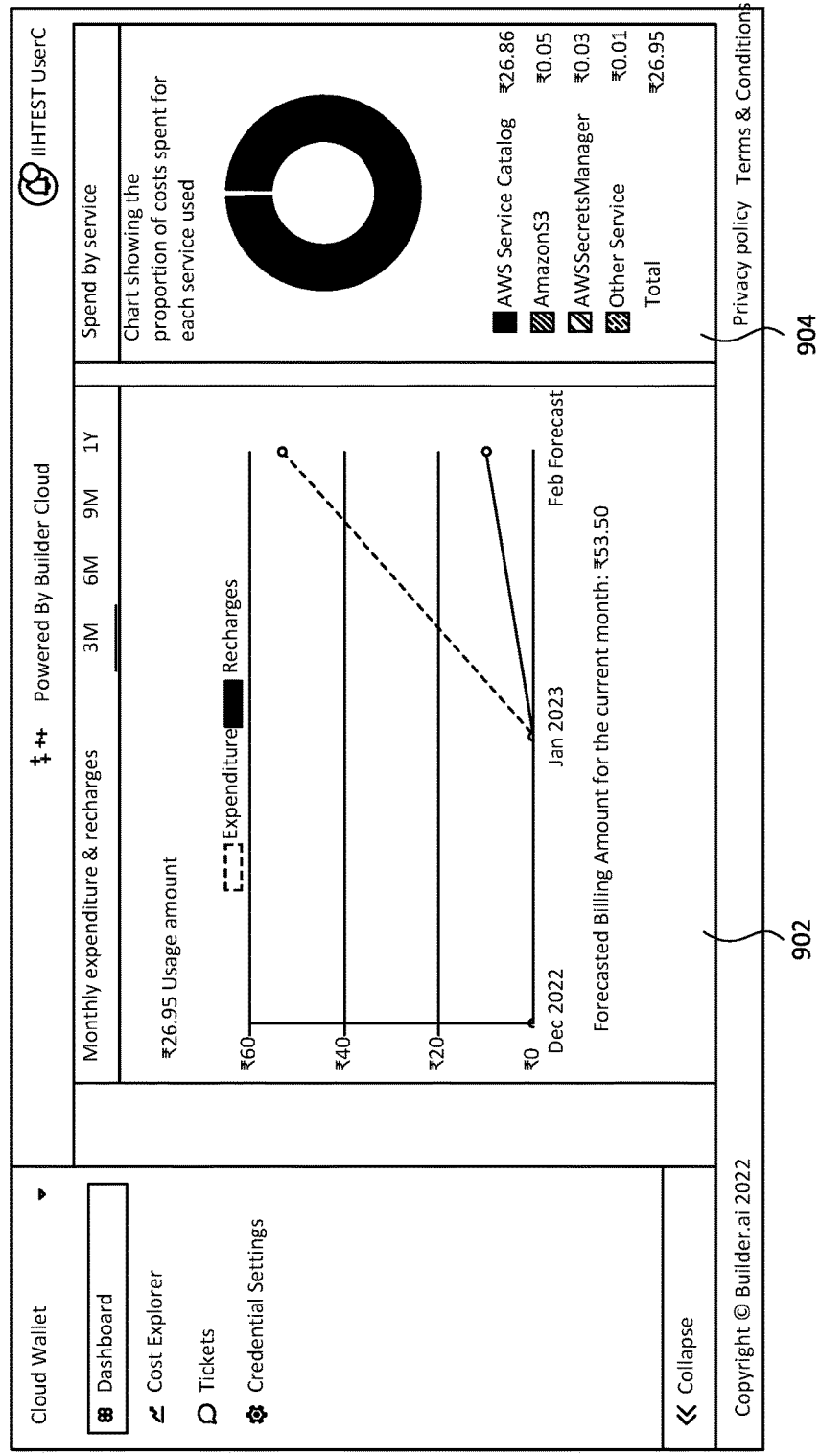
FIG. 9 illustrates a cloud management screen illustrates a usage and cost associated with a batch in an embodiment of the disclosed subject matter.

Referring to FIG. 9, FIG. 9 illustrates a cloud management screen 900 illustrates a usage and cost associated with a batch in an embodiment of the disclosed subject matter. As shown, the cloud management screen 900 includes an expenditure forecasting area 902 and a service proportion area 904. The expenditure forecasting area 902 illustrates a graph showing a cloud usage amount analyzed by the cloud usage analysis module 640 using data points on a linear graph. The y-axis of the graph includes the amounts and the x-axis of the graph includes the months. The expenditure forecasting area 902 also shows the forecasted billing amount for the current month determined by the future cloud usage prediction module 690.

The service proportion area 904 shows the proportions of costs spent for one or more services. In an example, the proportions may be shown using a pie chart. The one or more services may include AWS service catalog, Amazon S3, AWS secrets manager, other services, and the like. The service proportion area 904 shows the cost spend for each service and also shows the total cost that is determined by adding the individual costs for each service. Thus, the cloud management screen 900 is capable of presenting the cloud expenses, the service expenses, and future cloud predictions in a single screen for the developers 610 or users 620 to analyze.

Figure 10:
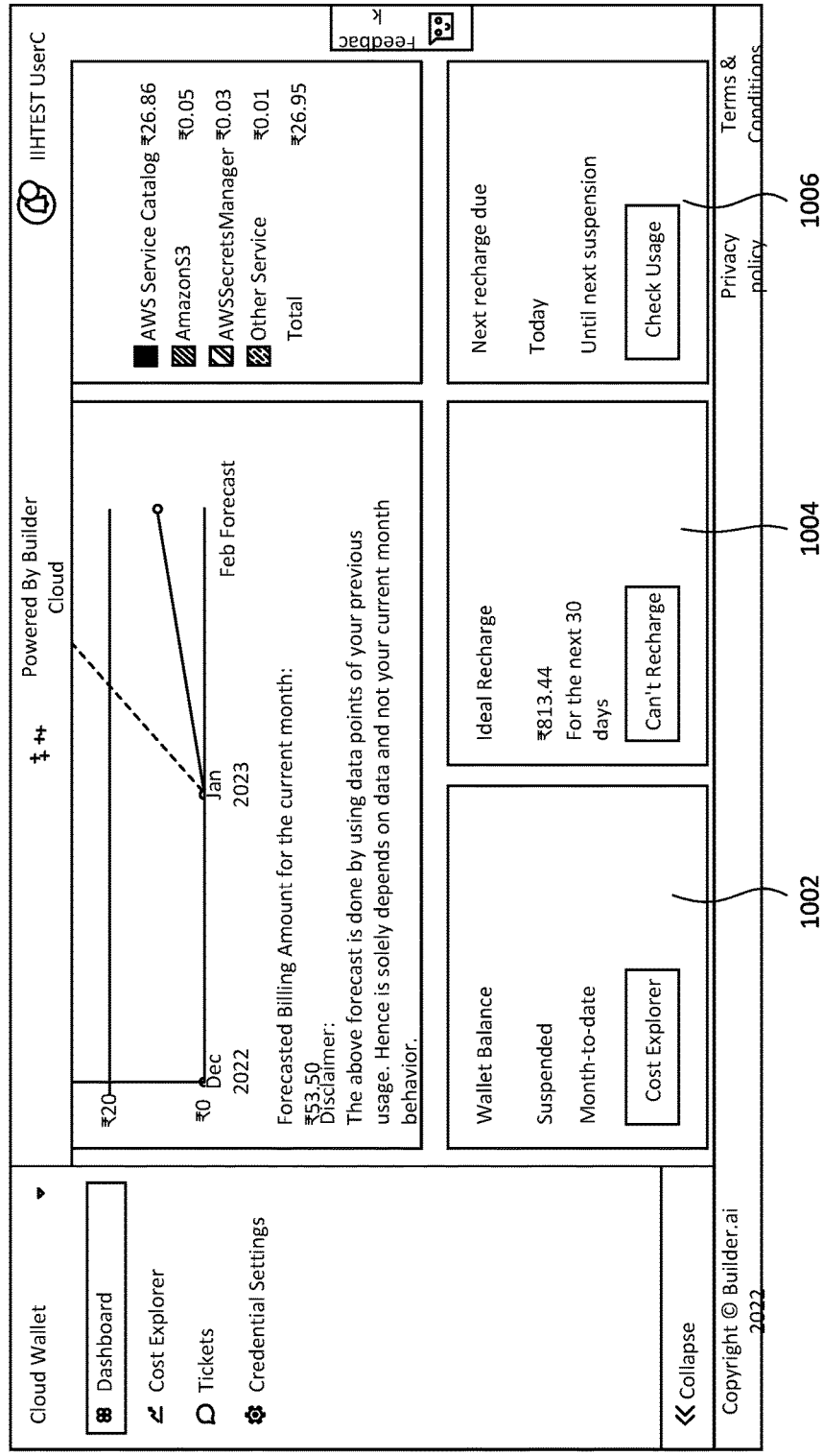
FIG. 10 illustrates a recharge screen for a batch in an embodiment of the disclosed subject matter.

Referring to FIG. 10, FIG. 10 illustrates a recharge screen 1000 for a batch in an embodiment of the disclosed subject matter. As shown, the recharge screen 1000 includes a wallet balance area 1002, an ideal recharge area 1004, and a usage checking area 1006. The wallet balance area 1002 illustrates the current balance of the cloud wallet generated by the cloud wallet generation module 685. When clicking the cost explorer button, the developers 610 or users 620 may be able to view a timeline of their cloud wallet balances. The ideal recharge area 1004 illustrates the ideal recharge amount determined by the ideal cost estimation module 675. The developers 610 or users 620 will be able to instantly recharge their cloud wallet by clicking a recharge button or a can't recharge button requesting for assistance in the ideal recharge area 1004. Further, the usage checking area 1006 mentions when the next recharge payment is due from the developers 610 or users 620.

Figure 11:
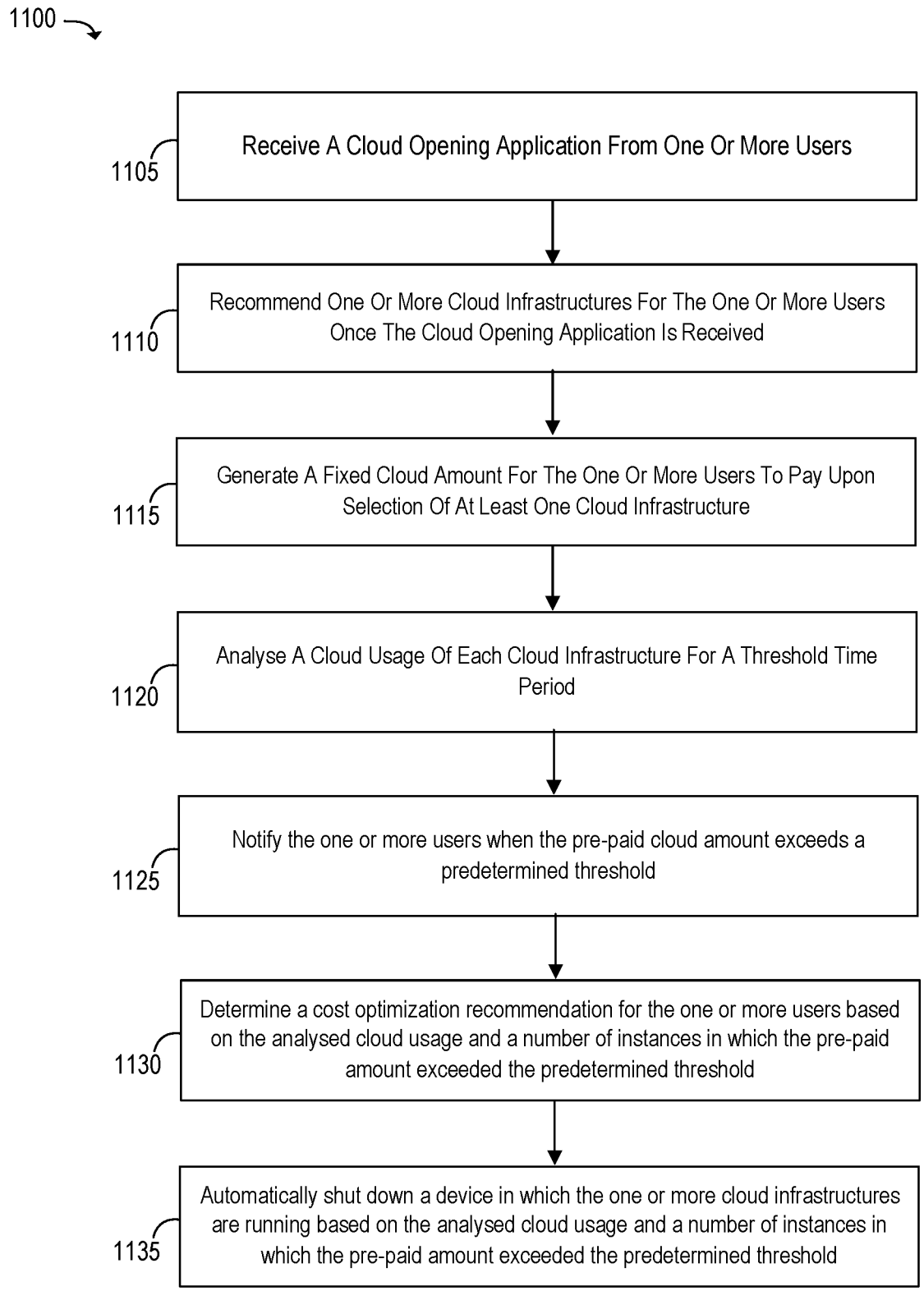
FIG. 11 is a flow diagram illustrating a method for optimizing cloud management costs in an embodiment of the disclosed subject matter.

Referring to FIG. 11, FIG. 11 is a flow diagram 1100 of an embodiment of the disclosed subject matter. The flow diagram 1100 illustrates a method for optimizing cloud management costs. The software application may be any executable process on a computer system comprising instructions, designs, art, user interfaces, audio recordings, music, video, and the like. The software application is not limited to any commercial or consumer application. For example, the software application may be a utility application, a production application, a document generator, a game, and artistic application, and accounting application, or the like. Steps 1105-1135 of the flow diagram 1100 may be executed using the server 605 of FIGS. 6-7. Each step is explained in further detail below.

At step 1105, a cloud account opening application is received. The request for creating the one or more cloud accounts may be made by the one or more developers 610, one or more designers 615, or the one or more users 620. The cloud accounts may be created for personal purposes, business purposes, entertainment purposes, legal purposes, and the like. The information may include personal information, business-related information, contact information, reason for opting for cloud services, products/services offered, future goals, and the like.

At step 1110, one or more cloud infrastructures are recommended for the one or more developers 610, designers 615, or users 620 once the cloud account opening application is received in step 1105. The one or more cloud infrastructures may be cloud platforms known to a person skilled in the art. For instance, the cloud infrastructure recommendations may be made based on one or more parameters. The one or more parameters may include requirements provided by the one or more developers 610, designers 615, or users 620 in the cloud account opening application, a project size, supporting technologies, features offered, a cloud architecture, a cloud security, and a deployment timeline.

At step 1115, a fixed cloud amount is generated for the one or more developers 610, designers 615, or users 620 to pay upon selection of at least one cloud infrastructure recommended by the cloud infrastructure recommendation module 630. The fixed cloud amount or monthly cloud cost may be a one-time recharge amount having a low threshold. In an example, the low threshold may be $100, $150, $200, and the like. The fixed cloud amount is less and is useful for users 620 who have a low financial spending ability. Such people may make cloud payments without having to pay a large amount or a fixed amount. The fixed cloud amount may be paid using one or more modes of payment such as credit card, debit card, internet banking, UPI payment, and the like.

At step 1120, a cloud usage for each cloud infrastructure selected and used by the one or more developers 610, designers 615, or users 620 is analyzed. The cloud usage may be analyzed for a threshold time period. In an example, the threshold time period may be one month, three months, six months, nine months, one year, and the like. The cloud usage corresponds to reviewing and observing a storage usage amount and cost usage amount for the one or more developers 610, designers 615, or users 620 while hosting their respective projects. The cloud usage monitoring may be an automated process that reviews/analyses an operational capacity and a health status of the one or more cloud infrastructures. Further, the cloud usage may be presented using a number value based on the fixed cloud amount paid by the one or more developers 610, designers 615, or users 620.

At step 1125, the one or more developers 610, designers 615, or users 620 are notified once their fixed cloud amount exceeds a predetermined threshold. The predetermined threshold may be automatically set and is generally set to a value close to the fixed cloud amount. In an example, if the fixed cloud amount for a month is $100, then the predetermined threshold may be set to $80. The predetermined threshold is set to a value that differs less than the total fixed amount. Further, the one or more developers 610, designers 615, or users 620 may be notified once the fixed cloud amount has exceeded the threshold using a written message, a voice message, an email message, and the like.

At step 1130, a cost optimization recommendation for the one or more developers 610, designers 615, or users 620 is determined based on the cloud usage analyzed in step 1125. The cost optimization recommendation may be determined by taking one or more factors such as the fixed cloud amount, a remaining cloud usage for a threshold time period, a number of instances in which the fixed cloud amount exceeded the predetermined threshold, project size, project requirements, and the like into consideration. In case the developers 610, designers 615, or users 620 have queries with respect to the ideal recharge amount and the other recommendations provided to them, they may provide their feedback. Based on their provided feedback, the cost optimization previously recommended may be modified.

At step 1135, the device(s) in which the one or more cloud infrastructures are currently running are automatically shut down when the number of instances in which the remaining cloud usage is less than the usage threshold and the number of instances in which the fixed cloud amount exceeds the predetermined threshold is 2-3 times. Automatic shutting down is another way to inform the developers 610, designers 615, or users 620 that their cloud usage is being exceeded and they have to keep a watch regarding their usage.

Figure 12:
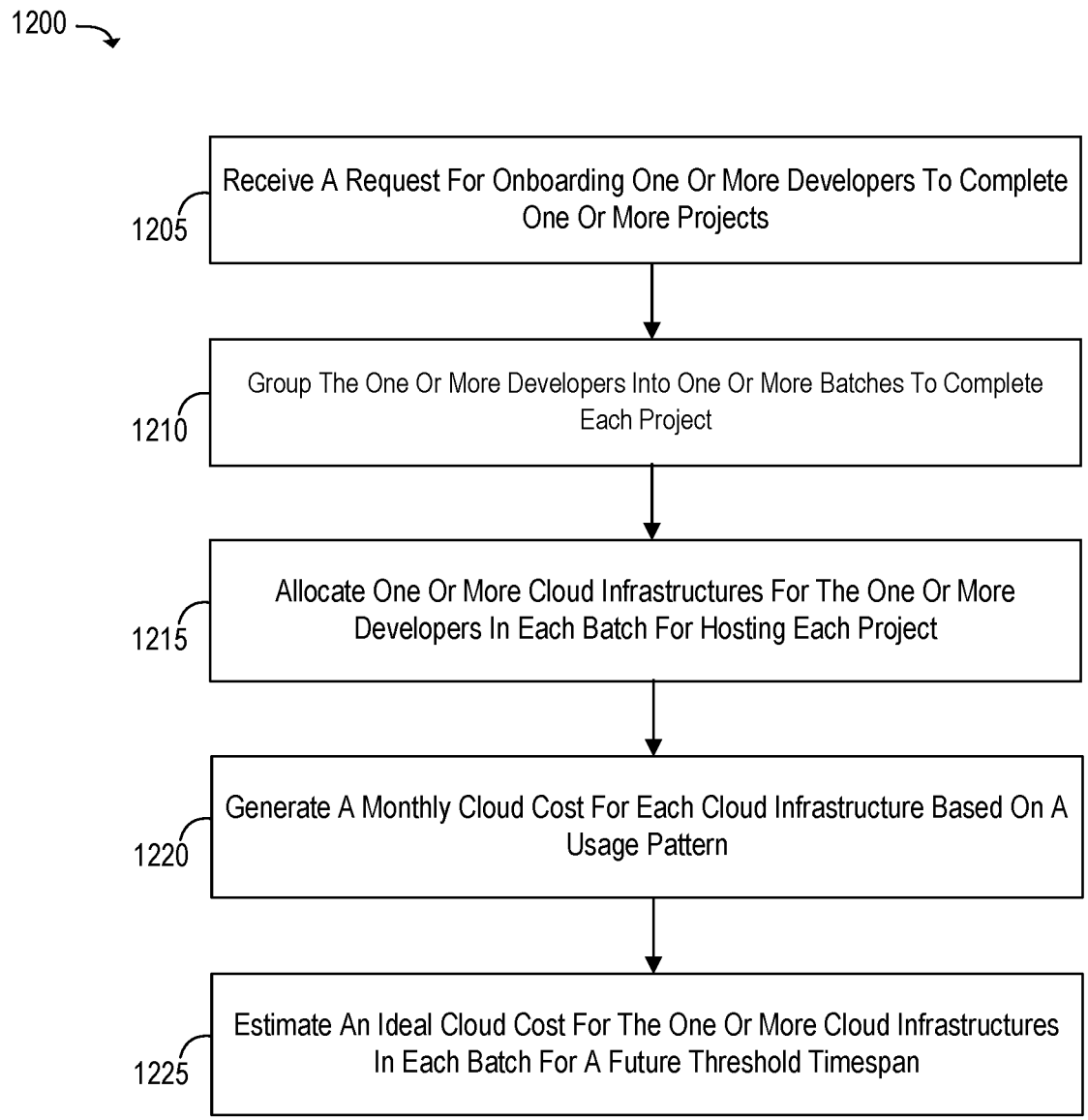
FIG. 12 is a flow diagram illustrating a method for regulating multi-cloud expenses in an embodiment of the disclosed subject matter.

Referring to FIG. 12, FIG. 12 is a flow diagram 1200 of an embodiment of the disclosed subject matter. The flow diagram 1200 illustrates a method for regulating multi-cloud expenses. Steps 1205-1225 of the flow diagram 1200 may be executed using the server 605 of FIGS. 6-7. Each step is explained in further detail below.

At step 1205, a request for onboarding the one or more developers 610 or designers 615 to complete the one or more projects is received. For instance, the one or more developers 610 or designers 615 may be onboarded based on a selection criteria. The selection criteria includes a background of the one or more developers 610, works performed by the one or more developers 610, and a performance of the one or more developers 610 in an expert onboarding assessment. The expert onboarding assessment relates to a test that is automatically generated by the onboarding request module 660 that evaluates a skillset of the one or more developers 610.

At step 1210, the one or more developers 610 are grouped into one or more batches to compete each project. For instance, the one or more developers 610 may be grouped based on a grouping criteria. The grouping criteria is based on a project importance, a project deadline, a project complexity, a staff requirement, and the performance of the one or more developers in the expert onboarding assessment. The performance in the expert onboarding assessment is an important measure taken while adding the developers 610 to the batches. The one or more batches may include a junior batch, an intermediate batch, and an advanced batch. The one or more developers 610 in the junior batch would be allocated projects or would be assigned to do tasks of a project having less complexity. The one or more developers 610 in the intermediate batch would be allocated project tasks having a slightly higher complexity, and the developers 610 in the advanced batch would be allocated project tasks having a high complexity and would require experience for timely completion. Further, the one or more developers 610 may also be moved to higher batches (junior batch to intermediate batch or intermediate batch to advanced batch) based on their performance.

At step 1215, one or more cloud infrastructures are allocated for each batch. The one or more developers 610 in each batch would be able to commonly use one or more cloud infrastructures allocated for each batch. Thus, the developers 610 do not need to individually purchase or make payments for accessing the cloud infrastructures as the users 620/companies/entities that have assigned the projects to the one or more developers 610 to work on provide the funding from there end. The cloud infrastructure allocation for each batch is based on one or more factors, such as the grouping criteria of the one or more developers 610, a project size, features offered, cloud architecture, cloud security, and the like.

At step 1220, a monthly cloud cost is determined/generated for each batch based on a usage pattern. The monthly cloud cost may also be determined based on the number of batches, a total cloud space allocation, a number of cloud infrastructures/platforms required for hosting the projects, locations of the one or more developers 610 in each batch, and the like. The monthly cloud cost is to be payable on the last day of each month and may vary each month based on the cloud resources utilized. Further, the monthly cloud cost is directly proportional to the usage pattern analyzed.

At step 1225, an ideal cloud cost for the one or more cloud infrastructures in each batch is determined. The ideal cloud cost corresponds to an estimated cloud cost for the following months. The ideal cloud cost may be estimated for a future threshold timespan. In an example, the future threshold timespan may be one month, three months, six months, nine months, and the like. The ideal cost may be determined based on one or more factors. For instance, the one or more factors a total number of batches, a time period usage, a total fund allocation, a bandwidth, and a previous usage history.

Figure 13:
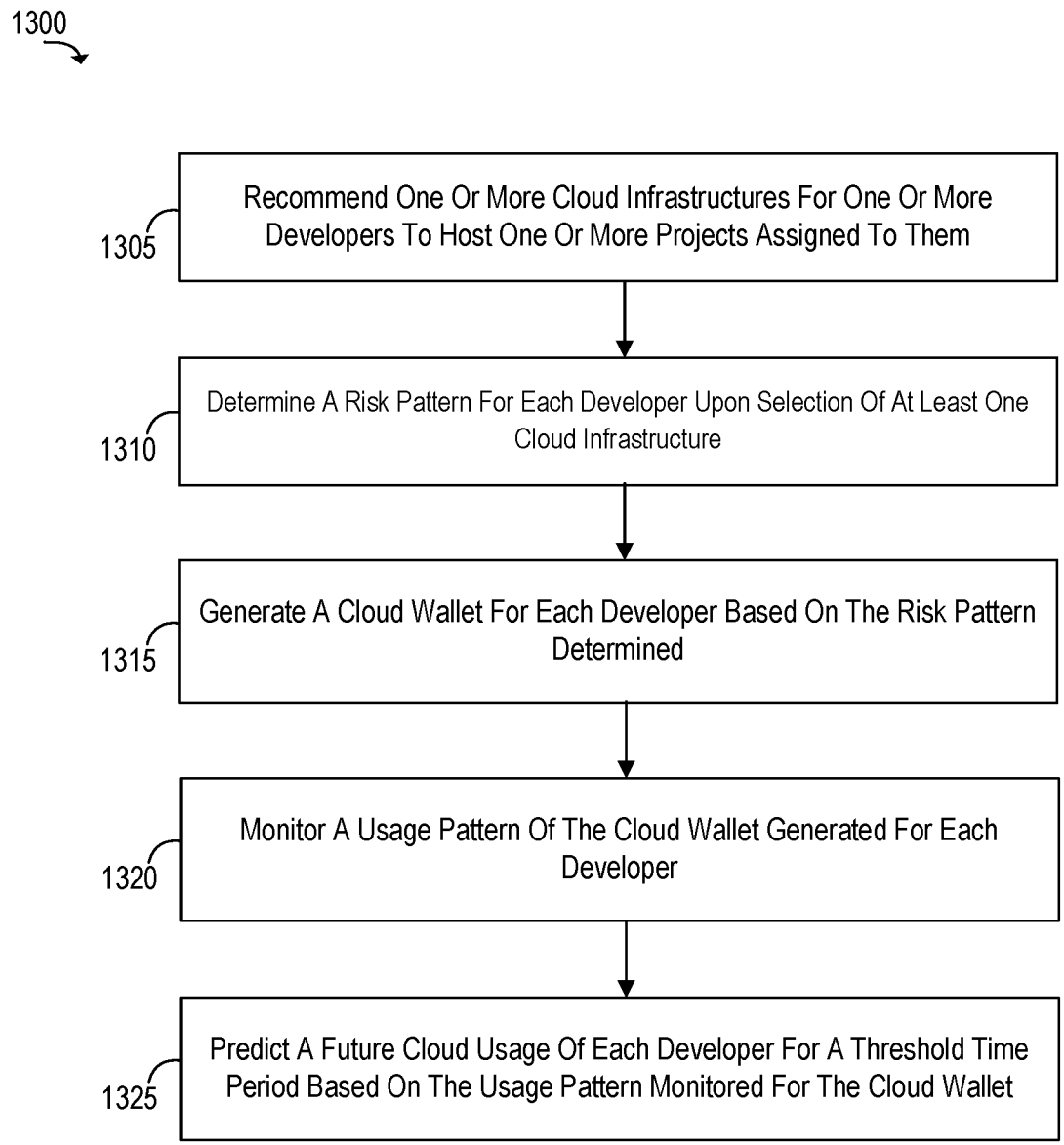
FIG. 13 is a flow diagram illustrating a method for analyzing risks associated with one or more developers in multi-cloud platforms in an embodiment of the disclosed subject matter.

Referring to FIG. 13, FIG. 13 is a flow diagram 1300 of an embodiment of the disclosed subject matter. The flow diagram 1300 illustrates a method for analyzing risks associated with the one or more developers 610 in multi-cloud platforms. Steps 1305-1325 of the flow diagram 1300 may be executed using the server 605 of FIGS. 6-7. Each step is explained in further detail below.

At step 1305, one or more cloud infrastructures are recommended for the one or more developers 610 to host the one or more projects assigned to them. The cloud infrastructure recommendations may be made based on one or more parameters. The one or more parameters may include requirements provided by the one or more developers 610, designers 615, or users 620 in the cloud account opening application, a project size, supporting technologies, features offered, a cloud architecture, a cloud security, and a deployment timeline.

At step 1310, a risk pattern for each of the developers 610 is determined upon selection of at least one cloud infrastructure recommended in step 1305. The risk pattern is used to evaluate how much risk can be taken on each of the developers 610 while evaluating work to them. In an example, the risks may include cloud space allocation, funds allocation, project allocation, and the like. The risk pattern is determined based on one or more factors. The one or more factors may include a previous usage pattern of the one or more developers 610 analyzed by the cloud usage analysis module 640, a background of the one or more developers 610, a project complexity, a project deadline, and the like. Such analysis ensures that the developers 610 are allocated with appropriate cloud spaces and appropriate funds based on their historical data.

At step 1315, a cloud wallet 166 is generated for the one or more developers 610 to handle payment transactions based on the risk pattern determined in step 1310. The cloud wallet 166 enables secure handling of transactions between various individuals and/or groups that work on a software project.

At step 1320, a usage pattern/spending pattern of the one or more developers 610 is monitored for each cloud wallet generated for them. For instance, the usage pattern or spend pattern may be monitored on a periodic basis (for example, 1 month, 3 months, 6 months, 9 months, 1 year, and the like). Based on the monitoring, the one or more developers 610 are grouped into a spending category. The spending category may include low spending, medium spending, and high spending. The developers 610 are grouped into their respective category by comparing their usage pattern/spending pattern with a spending limit, where each spending category has a limit range (for example, below $10, between $11 and $25, above $50, and the like).

At step 1325, a future cloud usage for each of the developers 610 is predicted based on the usage pattern/spend pattern monitored in step 1320. For instance, the future cloud usage may be monitored for a threshold time period. In an example, the threshold time period may be one month, three months, six months, nine months, one year, and the like. The forecasted billing amount may be predicted for the current month and the forecasted billing amount for the following months. The future cloud usage or forecasted billing amount may be determined using a trained AI/ML model. One or more inputs, such as the usage pattern/spend pattern monitored by the cloud wallet generation module 685, changes in the project workflow, project deadlines, and the like my be fed to the trained AI/ML model.

The system and method described herein is capable of generating a fixed cloud amount for developers or users accessing the cloud platforms/cloud infrastructures to pay. The fixed cloud amount is a one-time recharge amount having a low threshold. The fixed cloud amount is less and is useful for users who have a low financial spending ability. Such people may make cloud payments without having to pay a large amount or a fixed amount. Further, the system and method described herein is capable of notifying the developers or users once their fixed cloud amount exceeds a pre-determined threshold. The developers or users may be notified via a written message, voice message, email message, automatic shutting down of the device(s) in which their cloud platform/cloud infrastructures are currently running. Such notifications may help in quickly grabbing the attention of the developers or users.

The system and method described herein is further capable of generating a monthly cloud cost that is directly proportional to their cloud usage pattern for the developer or users accessing the cloud platforms/cloud infrastructures. The monthly cloud cost may also be determined based on the number of batches, a total cloud space allocation, a number of cloud infrastructures/platforms required for hosting the projects, locations of the one or more developers in each batch, and the like. The system and method described herein is also capable of forecasting or predicting a future cloud cost (future monthly cloud cost) based on one or more factors a total number of batches, a time period usage, a total fund allocation, a bandwidth, and a previous usage history. Based on the forecasting, the system and method described herein determines cost optimization recommendations for the developers or users. The cloud cost optimization recommendations may be provided based on the cloud usage history analysis, cloud cost analysts, project requirements, and the like. This process is an automated process without having the developers or users to manually check the following cloud parameters.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and such modifications are considered to be within the scope of the present disclosure.

The embodiments herein and the various features and advantageous details thereof are explained with reference to the non-limiting embodiments in the following description. Descriptions of well-known components and processing techniques are omitted so as to not obscure the embodiments herein. The examples used herein are intended merely to facilitate an understanding of ways in which the embodiments herein may be practiced and to further enable those of skill in the art to practice the embodiments herein. Accordingly, the examples may not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications may and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

Any discussion of documents, acts, materials, devices, articles or the like that has been included in this specification is solely for the purpose of providing a context for the disclosure. It is not to be taken as an admission that any of these matters form a part of the prior art base or were common general knowledge in the field relevant to the disclosure as it existed anywhere before the priority date of this application.

The numerical values mentioned for the various physical parameters, dimensions or quantities are approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the embodiments, it will be appreciated that many embodiments can be made and that many changes can be made in the embodiments without departing from the principles of the disclosure. These and other changes in the embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A system for analyzing risks associated with one or more developers in multi-cloud platforms, the system comprising:
    a processor coupled to a memory, the processor configured to:
        recommend one or more cloud infrastructures for the one or more developers to host one or more projects assigned to the one or more developers, wherein the one or more cloud infrastructures are recommended based on one or more parameters;
        determine a risk pattern for each developer upon selection of at least one cloud infrastructure, wherein the risk pattern is determined based on one or more factors;
        generate a cloud wallet for each developer based on the risk pattern determined;
        monitor a usage pattern of the cloud wallet generated for each developer; and
        predict a future cloud usage of each developer for a threshold time period based on the usage pattern monitored for the cloud wallet.

2. The system of claim 1, wherein the one or more parameters are based on at least one of a project size, features offered, a cloud architecture, and a cloud security.

3. The system of claim 1, wherein the one or more factors are based on at least one a previous usage pattern of the one or more developers, a background of the one or more developers, a project complexity, and a project deadline.

4. The system of claim 1, wherein the processor is further configured to receive one or more inputs to modify the cloud wallet generated for each developer based on the risk pattern.

5. The system of claim 4, wherein the processor is further configured to:
    review the one or more inputs received to modify the cloud wallet; and
    update the cloud wallet incorporating the one or more inputs upon an acknowledgement from one or more authorized persons.

6. A method for optimizing cloud management costs, the method comprising:
    recommending one or more cloud infrastructures for one or more developers to host one or more projects assigned to the one or more developers, wherein the one or more cloud infrastructures are recommended based on one or more parameters;
    determining a risk pattern for each developer upon selection of at least one cloud infrastructure, wherein the risk pattern is determined based on one or more factors;
    generating a cloud wallet for each develop based on the risk pattern determined;
    receiving one or more inputs to modify the cloud wallet generated for each developer based on the risk pattern;
    reviewing the one or more inputs received to modify the cloud wallet; and
    updating the cloud wallet incorporating the one or more inputs upon an acknowledgement from one or more authorized persons.

7. The method of claim 6, wherein the one or more parameters are based on at least one of a project size, features offered, a cloud architecture, and a cloud security.

8. The method of claim 6, wherein the one or more factors are based on at least one a previous usage pattern of the one or more developers, a background of the one or more developers, a project complexity, and a project deadline.

9. The method of claim 6, further comprising monitoring a usage pattern of the cloud wallet generated for each developer.

10. The method of claim 9, further comprising predicting a future cloud usage of each developer for a threshold time period based on the usage pattern monitored for the cloud wallet.

11. A non-transitory computer readable storage medium having data stored therein representing software executable by a computer, the software comprising instructions that, when executed, cause the computer readable storage medium to perform:
    recommending one or more cloud infrastructures for one or more developers to host one or more projects assigned to the one or more developers, wherein the one or more cloud infrastructures are recommended based on one or more parameters;
    determining a risk pattern for each developer upon selection of at least one cloud infrastructure, wherein the risk pattern is determined based on one or more factors;
    generating a cloud wallet for each develop based on the risk pattern determined;
    monitoring a usage pattern of the cloud wallet generated for each developer; and
    predicting a future cloud usage of each developer for a threshold time period based on the usage pattern monitored for the cloud wallet.

12. The computer readable storage medium of claim 11, wherein the one or more parameters are based on at least one of a project size, features offered, a cloud architecture, and a cloud security.

13. The computer readable storage medium of claim 11, wherein the one or more factors are based on at least one a previous usage pattern of the one or more developers, a background of the one or more developers, a project complexity, and a project deadline.

14. The computer readable storage medium of claim 11, wherein the instructions further cause the computer readable storage medium to perform:
    receiving one or more inputs to modify the cloud wallet generated for each developer based on the risk pattern;
    reviewing the one or more inputs received to modify the cloud wallet; and updating the cloud wallet incorporating the one or more inputs upon an acknowledgement from one or more authorized persons.

\* \* \* \* \*